(12) United States Patent
Lee et al.

(10) Patent No.: US 10,618,406 B2
(45) Date of Patent: Apr. 14, 2020

(54) USER INTERFACE APPARATUS, VEHICLE HAVING THE SAME, AND METHOD OF CONTROLLING THE VEHICLE

(71) Applicant: HYUNDAI MOTOR COMPANY, Seoul (KR)

(72) Inventors: Jia Lee, Goyang-si (KR); Jongmin Oh, Ulsan (KR); Gideok Kwon, Seoul (KR); Yong Lee, Suwon-Si (KR); Taeyub Kim, Jinju-si (KR); Hotaek Lee, Seoul (KR); HeeJin Ro, Seoul (KR); Inseong Park, Seoul (KR); Jong Yong Nam, Seongnam-Si (KR); Jong Bok Lee, Yongin-Si (KR); Seok-Young Youn, Seoul (KR); Gi Beom Hong, Bucheon-si (KR)

(73) Assignee: Hyundai Motor Company, Seoul (KR)

(*) Notice: Subject to any disclaimer, the term of this patent is extended or adjusted under 35 U.S.C. 154(b) by 848 days.

(21) Appl. No.: 14/559,633

(22) Filed: Dec. 3, 2014

(65) Prior Publication Data
US 2016/0004418 A1    Jan. 7, 2016

(30) Foreign Application Priority Data

Jul. 1, 2014    (KR) .......................... 10-2014-0082070

(51) Int. Cl.
*B60K 35/00*    (2006.01)
*G06F 3/0488*    (2013.01)

(52) U.S. Cl.
CPC ...... *B60K 35/00* (2013.01); *B60K 2370/1438* (2019.05); *B60K 2370/151* (2019.05);
(Continued)

(58) Field of Classification Search
CPC .................... B60K 35/00; B60K 37/02; B60K 2350/1012; B60K 2350/1024; B60K 2350/1028; B60K 2350/1032
See application file for complete search history.

(56) References Cited

U.S. PATENT DOCUMENTS 7,415,352 B2 *  8/2008  Olcott .................... B60K 35/00
                                                            701/400
7,683,771 B1 *  3/2010  Loeb ...................... B60K 35/00
                                                            340/438
(Continued)

FOREIGN PATENT DOCUMENTS

KR    10-2011-0025394 A    3/2011
KR    10-2011-0130459 A    12/2011
(Continued)

OTHER PUBLICATIONS

Korean Office Action issued in Korean Application No. 10-2014-0082070 dated May 18, 2015, with English Translation.

*Primary Examiner* — Ryan F Pitaro
(74) *Attorney, Agent, or Firm* — Morgan, Lewis & Bockius LLP

(57) ABSTRACT

A user interface apparatus includes a first user interface configured to display host information; and a second user interface configured to display guest information, and to transmit the guest information to the first user interface if a linking signal for the guest information is received, wherein the first user interface displays the guest information by changing the host information to the guest information. Therefore, by integrating a cluster which is a first user interface with a center fascia which is a second user interface to implement a large area screen, and linking information between the cluster and the center fascia, it is possible to (Continued)

reduce attention dispersion during driving, to improve a driver's recognition rate, and to improve a driver's convenience.

30 Claims, 44 Drawing Sheets

(52) U.S. Cl.
CPC .. *B60K 2370/167* (2019.05); *B60K 2370/182* (2019.05); *B60K 2370/195* (2019.05); *B60K 2370/736* (2019.05); *B60K 2370/739* (2019.05); *G06F 3/0488* (2013.01)

(56) References Cited

U.S. PATENT DOCUMENTS

| | | | | |
|---|---|---|---|---|
| 8,370,059 | B2* | 2/2013 | Sakai | G01C 21/3673 345/625 |
| 8,677,284 | B2* | 3/2014 | Aguilar | G06F 3/04815 715/830 |
| 10,019,066 | B2* | 7/2018 | Boblett | G06F 3/017 |
| 2002/0176245 | A1* | 11/2002 | Fuwausa | B60K 35/00 362/84 |
| 2003/0023352 | A1* | 1/2003 | Ogino | B60K 35/00 701/1 |
| 2005/0001714 | A1* | 1/2005 | Amari | B60K 35/00 340/425.5 |
| 2006/0220923 | A1* | 10/2006 | Tanizaki | G01C 21/36 340/995.1 |
| 2010/0260350 | A1* | 10/2010 | Chutorash | B60K 35/00 381/86 |
| 2010/0305903 | A1* | 12/2010 | Sharpe | A47J 31/002 702/176 |
| 2011/0082616 | A1* | 4/2011 | Small | B60K 35/00 701/31.4 |
| 2011/0196578 | A1 | 8/2011 | Strohmaier et al. | |
| 2012/0023524 | A1* | 1/2012 | Suk | H04N 21/42222 725/43 |
| 2012/0065815 | A1* | 3/2012 | Hess | B60K 37/00 701/2 |
| 2013/0097557 | A1* | 4/2013 | Madau | A61B 5/18 715/810 |
| 2013/0227483 | A1* | 8/2013 | Thorsander | G06F 3/04842 715/821 |
| 2013/0293364 | A1* | 11/2013 | Ricci | B60K 35/00 340/425.5 |
| 2014/0053116 | A1* | 2/2014 | Smith | G06F 9/4443 715/863 |
| 2015/0094910 | A1* | 4/2015 | Bassier | G06F 3/0416 701/41 |
| 2015/0145790 | A1* | 5/2015 | Kim | G02B 27/01 345/173 |
| 2015/0185030 | A1* | 7/2015 | Monroe | G01C 21/3438 701/532 |
| 2016/0046188 | A1* | 2/2016 | Wild | B60K 35/00 701/36 |
| 2016/0202850 | A1* | 7/2016 | Langlois | H04M 1/6091 715/771 |
| 2016/0328244 | A1* | 11/2016 | Ahmed | G06F 3/0482 |
| 2018/0018080 | A1* | 1/2018 | Chudzinski | B60K 35/00 |

FOREIGN PATENT DOCUMENTS

| | | |
|---|---|---|
| KR | 10-2012-0023458 A | 3/2012 |
| KR | 10-2012-0118915 A | 10/2012 |
| KR | 10-2014-0046323 A | 4/2014 |
| WO | 2010-042101 A1 | 4/2010 |

* cited by examiner

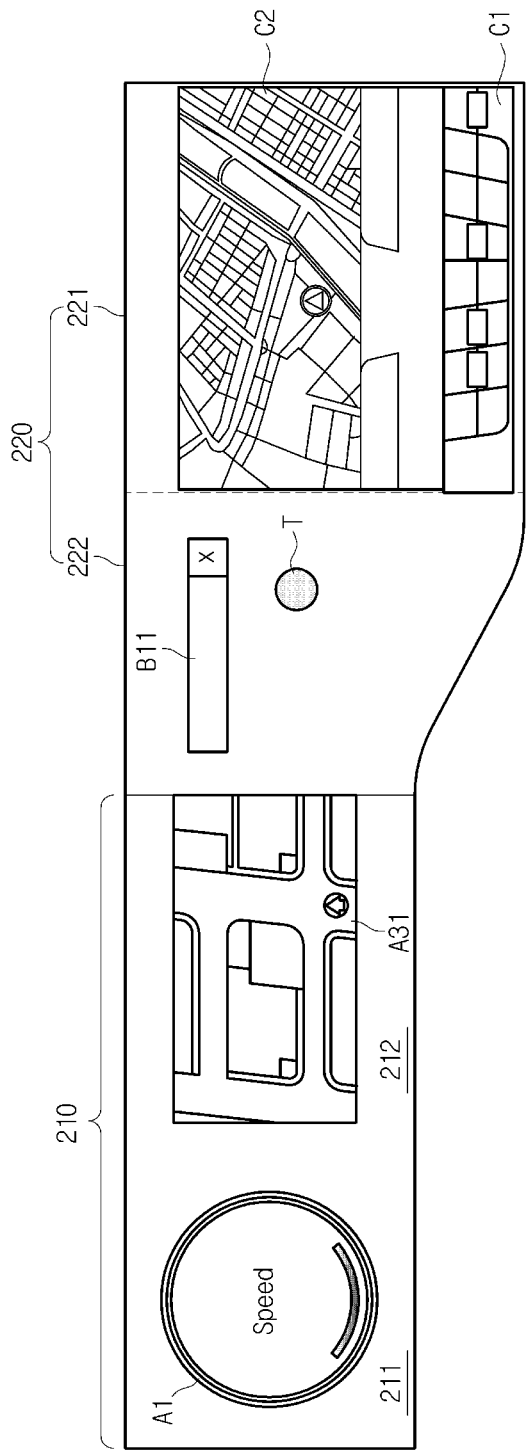

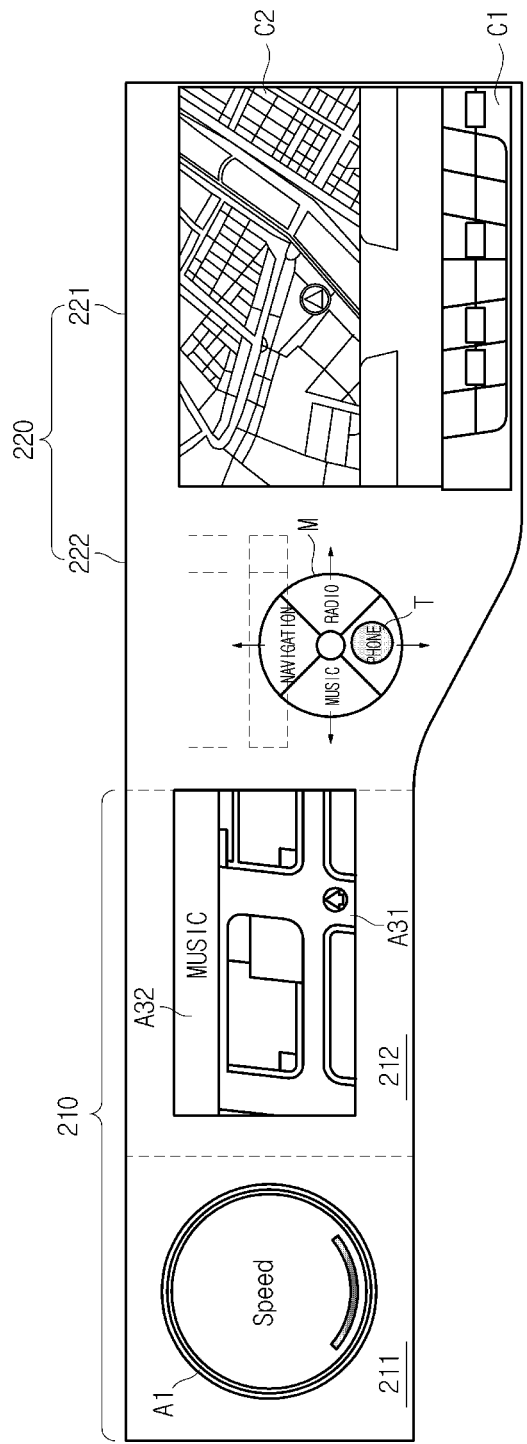

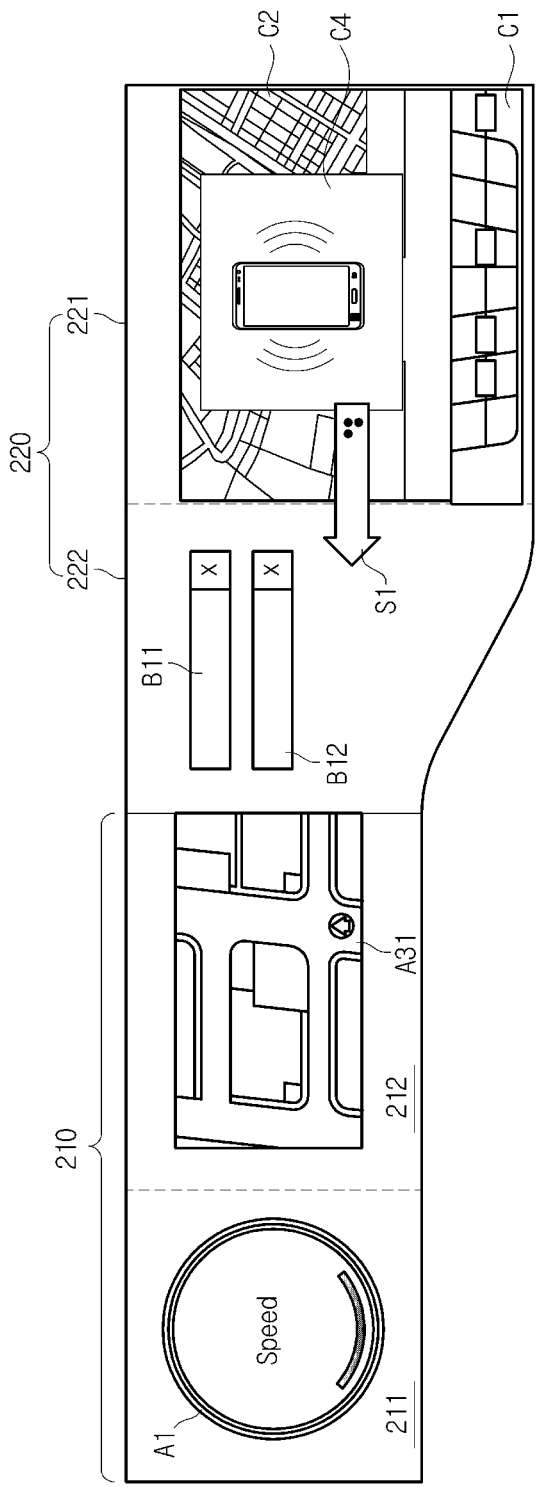

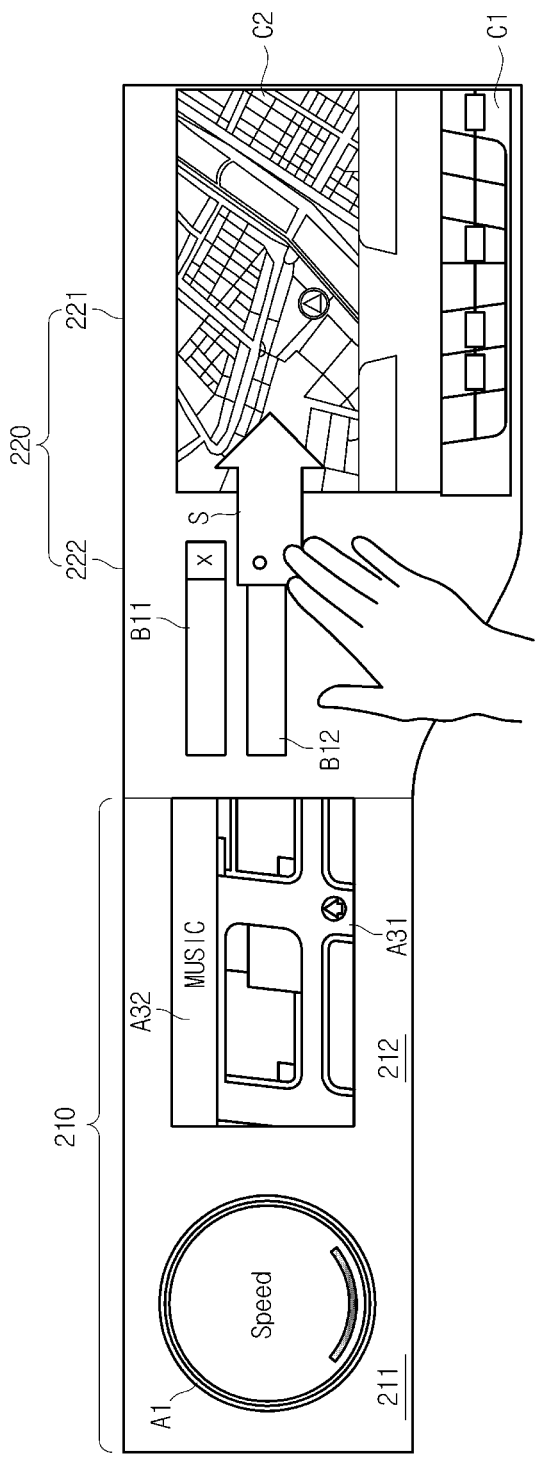

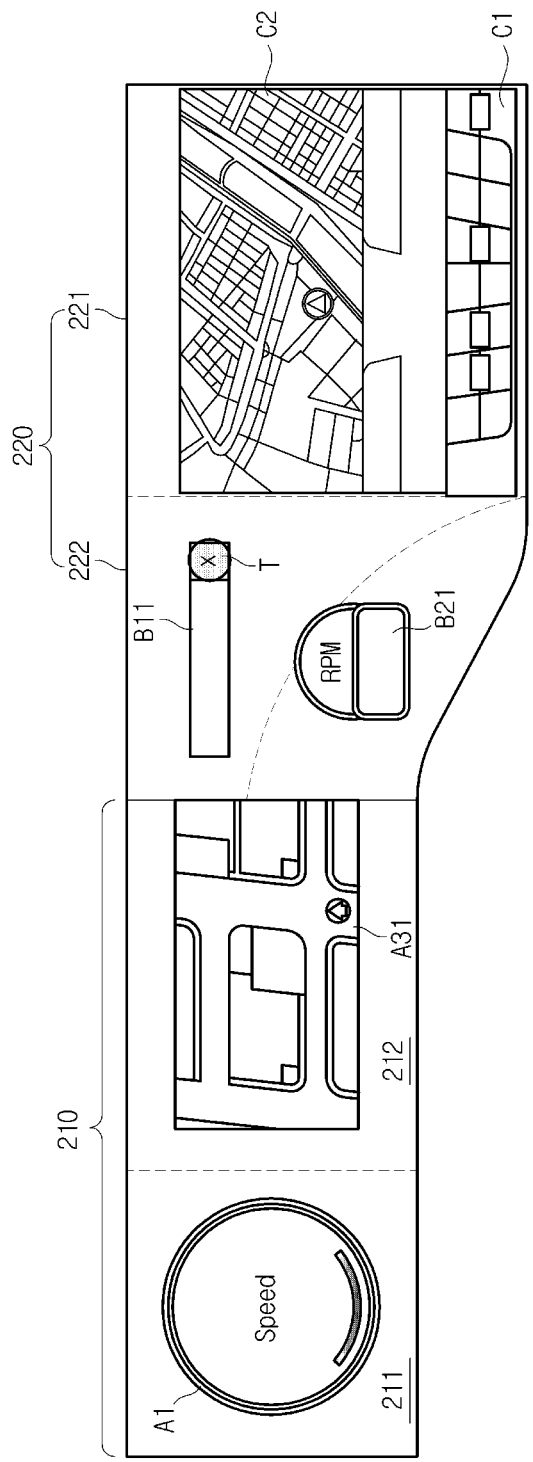

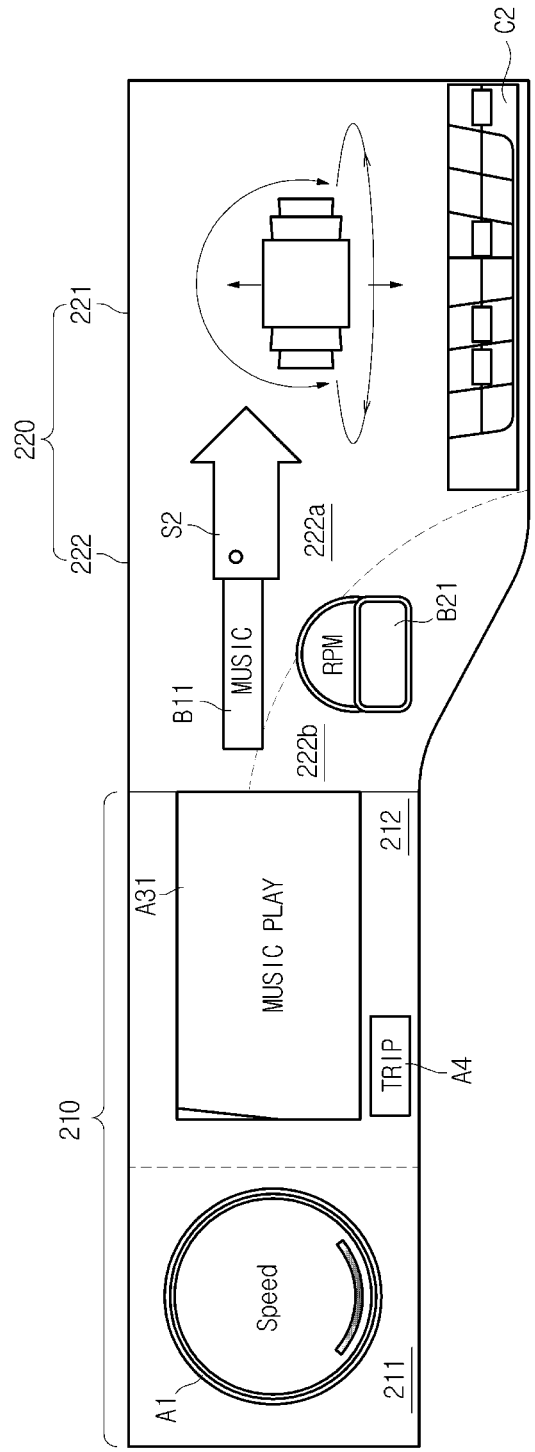

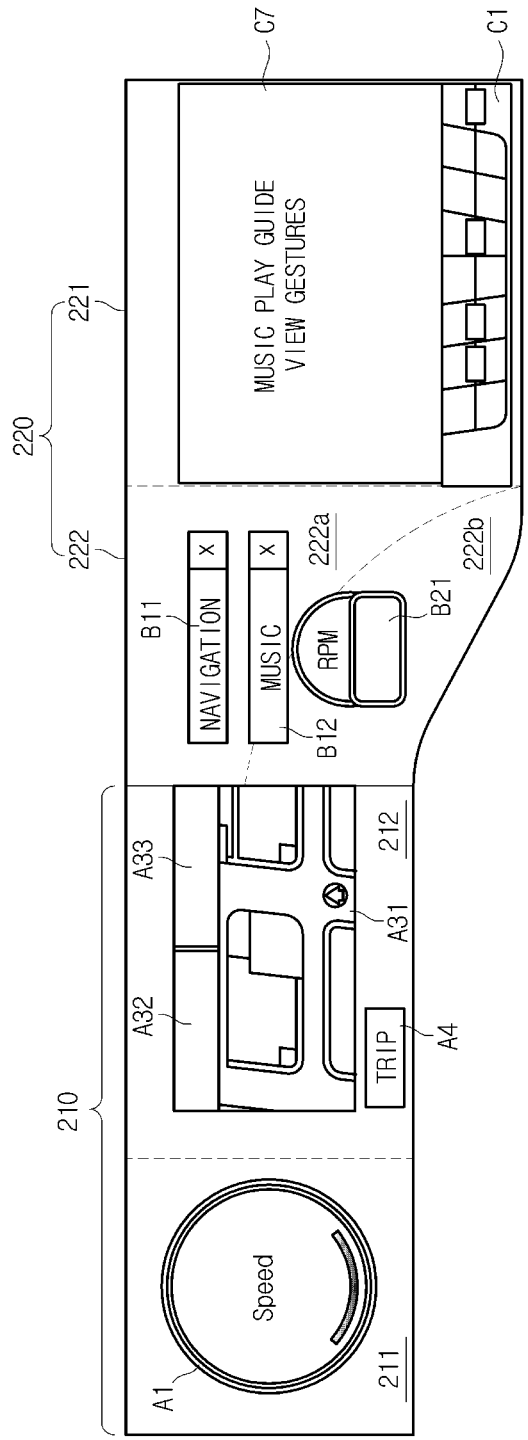

USER INTERFACE APPARATUS, VEHICLE HAVING THE SAME, AND METHOD OF CONTROLLING THE VEHICLE

CROSS-REFERENCE TO RELATED APPLICATION

This application claims the benefit of Korean Patent Application No. 2014-0082070, filed on Jul. 1, 2014 in the Korean Intellectual Property Office, the disclosure of which is incorporated herein by reference.

TECHNICAL FIELD

The present disclosure relates to a user interface apparatus of receiving a command from a user and outputting information about operation being performed, a vehicle having the user interface apparatus, and a method of controlling the vehicle.

DESCRIPTION OF THE RELATED ART

A vehicle includes a cluster that displays driving information and vehicle information, such as speed, revolutions per minute (RPM), gauge, and cooling water.

Generally, the vehicle further includes additional functions for a user's convenience, such as an audio play function, a video play function, a navigation function, a heating ventilating and air-conditioning (HVAC) control, a seat position control, a lighting control, etc., in addition to a driving function.

Also, the vehicle may include an audio video navigation (AVN) system into which a navigation function, an audio play function, and a video play function are integrated.

The vehicle includes a user interface apparatus to allow a user to input commands for executing such various functions and to output the operation states of the functions, and the user interface apparatus may be provided in a center fascia.

The user interface apparatus enables the user to interact with various apparatuses installed in the vehicle, and includes a physical user interface (PUI) and a graphical user interface (GUI).

The PUI receives commands from the user physically through a keypad, a remote controller, a touch pad, or the like, and the GUI receives commands from the user based on the user's input of selecting an icon or a menu displayed on a display.

More specifically, the user moves a cursor with reference to menus, lists, and icons displayed through the GUI to select a desired item at a location at which the cursor is placed. At this time, the user can select the desired item by moving the cursor through the PUI.

However, since the user interface apparatus and the AVN system are arranged in the center fascia, a driver may fail to keep his/her eyes forward when manipulating or checking the user interfaces or the AVN system.

SUMMARY

Therefore, an aspect of the present disclosure provides a user interface apparatus of linking information that is displayed on a first user interface with information that is displayed on a second user interface, and displaying a list of the linked information, a vehicle having the user interface apparatus, and a method of controlling the vehicle.

Another aspect of the present disclosure provides a user interface apparatus of moving a display area of a selected function based on touch and gesture information, and executing the selected function, a vehicle having the user interface apparatus, and a method of controlling the vehicle.

Another aspect of the present disclosure provides a user interface apparatus of additionally displaying an image of a selected function after scaling down the previous image if an image addition command is received, and deleting an image of a selected function by scaling up the previous image if an image deletion command is received, a vehicle having the user interface apparatus, and a method of controlling the vehicle.

Additional aspects of the disclosure will be set forth in part in the description which follows and, in part, will be obvious from the description, or may be learned by practice of the disclosure.

In accordance with one aspect of the present disclosure, a user interface apparatus includes: a first user interface configured to display host information; and a second user interface configured to display guest information, and to transmit the guest information to the first user interface if a linking signal for the guest information is received, wherein the first user interface displays the guest information by changing the host information to the guest information.

The first user interface may determine whether the linking signal is a signal representing sliding in a first direction or a signal representing sliding in a second direction, determine that the linking signal instructs addition of the guest information if the linking signal is the signal representing sliding in the first direction, and determine that the linking signal instructs deletion of the guest information if the linking signal is the signal representing sliding in the second direction.

If the first user interface determines that the linking signal is the signal representing sliding in the second direction, the first user interface may is configured to delete the guest information, and display the host information.

The first user interface includes a variable area to display one of the host information and the guest information, and a static area to display static information that is different from the host information.

The second user interface includes a first area to display the guest information, and a second area to display a list of information that is linked with the first user interface.

The guest information that is displayed in the first user interface and the guest information that is displayed in the second user interface may be different images.

The first user interface is configured to transmit the host information to the second user interface if the linking signal is received, and the second user interface is configured to scale down the host information and display the scaled-down host information.

The first user interface is configured to further display additional information, and scale down and display vehicle information if the linking signal is received.

If an external button is selected, the first user interface is configured to scale up the scaled-down additional information and displays the scaled-up additional information for a predetermined time period.

In accordance with another aspect of the present disclosure, a vehicle includes: a first user interface provided in a cluster, and configured to display host information; and a second user interface provided in a center fascia, and configured to display guest information, and to transmit the guest information to the first user interface if a linking signal for the guest information is received, wherein the first user interface displays, if the linking signal is received, the guest information by changing the host information to the guest information.

The first user interface and the second user interface may be arranged adjacent to each other.

The first user interface may determine whether the linking signal is a signal representing sliding in a first direction or a signal representing sliding in a second direction, determine that the linking signal instructs addition of the guest information if the linking signal is the signal representing sliding in the first direction, and determine that the linking signal instructs deletion of the guest information if the linking signal is the signal representing sliding in the second direction.

The first user interface may delete the guest information and display the host information if the first user interface determines that the linking signal is the signal representing sliding in the second direction.

Each of the signal representing sliding in the first direction and the signal representing sliding in the second direction may be generated when a plurality of touch inputs slide.

The first user interface may include a first display panel configured to display an image, and the second user interface comprises a second display panel configured to display an image, and a touch panel configured to receive a touch signal.

The first user interface may include a variable area to display one of the host information and the guest information, and a static area to display static information that is different from the host information.

If a plurality of guest information to be linked is received from the second user interface, the first user interface may display the plurality of guest information sequentially in an order in which linking commands are received.

If information of a navigation function is included in the plurality of guest information, the first user interface may give the navigation function high priority, and display the remaining guest information sequentially in the order in which the linking commands are received.

The second user interface may include a first area to display the guest information, and a second area to display a list of information that is linked with the first user interface.

The list that is displayed in the second area may include a deletion button.

If the deletion button is touched in the list displayed in the second area, the second user interface may delete the list, and transmit a command for stopping displaying information of a function corresponding to the list, to the first user interface.

If the second area displays a plurality of lists, the second user interface may display the plurality of lists sequentially in an order in which linking commands are received.

If the list displayed in the second area is touched and slides to the first area, the second user interface may delete the list, and transmit a command for stopping displaying information of a function corresponding to the list, to the first user interface.

The second user interface may display a menu if the second area is touched for a predetermined time period or more.

If the first area is touched by a single touch input, the second user interface may execute a function corresponding to information displayed at the touched location of the first area.

If second guest information is selected when first guest information is displayed in the first area, the second user interface may overlap the second guest information with an image of the first guest information.

If second guest information is selected when first guest information is displayed in the first area, the second user interface may delete an image of the first guest information, and display the second guest information.

The guest information that is displayed in the first user interface and the guest information that is displayed in the second user interface may be different images.

If the linking signal is received, the first user interface may transmit the host information to the second user interface, and the second user interface may scale down the host information and display the scaled-down host information.

The first user interface may further display additional information, and scale down and display vehicle information if the linking signal is received.

The additional information may include gauge information, mileage information, cooling water temperature information, and outside temperature information.

If an external button is selected, the first user interface may scale up the scaled-down additional information and display the scaled-up additional information for a predetermined time period.

The first user interface may scale down the guest information by a predetermined size, and display the additional information with the predetermined size for a predetermined time period.

The guest information may include navigation function information, audio function information, video function information, radio function information, air conditioning function information, and music play function information.

In accordance with another aspect of the present disclosure, a control method of a vehicle includes: displaying host information on a first user interface during driving; displaying guest information on the second user interface; transmitting the guest information to the first user interface if a first linking command is input to the second user interface; changing the host information displayed in the first user interface to the guest information, and displaying the guest information; and displaying a list of the guest information on the second user interface.

The control method may further include, if a second linking command is input to the second user interface, displaying the host information by deleting the guest information.

BRIEF DESCRIPTION OF THE DRAWINGS

These and/or other aspects of the disclosure will become apparent and more readily appreciated from the following description of the embodiments, taken in conjunction with the accompanying drawings of which:

FIGS. 8A to 8I illustrate user interfaces for describing examples of methods of displaying information of a function selected by a user on a first user interface of a user interface apparatus according to an embodiment of the present disclosure;

FIGS. 10A to 10C illustrate user interfaces for describing another example of a method of deleting information of a function displayed on a first user interface of a user interface apparatus according to an embodiment of the present disclosure;

FIGS. 13A and 13B illustrate user interfaces for describing an example of an operation of a user interface apparatus according to another embodiment of the present disclosure;

FIGS. 15A to 15F, 16A to 16D, and 17A and 17B illustrate user interfaces for describing examples of operations of a user interface apparatus according to another embodiment of the present disclosure; and FIG. 18 is illustrates a user interface for describing an example of an operation of a user interface apparatus according to another embodiment of the present disclosure.

DETAILED DESCRIPTION

Figure 1:
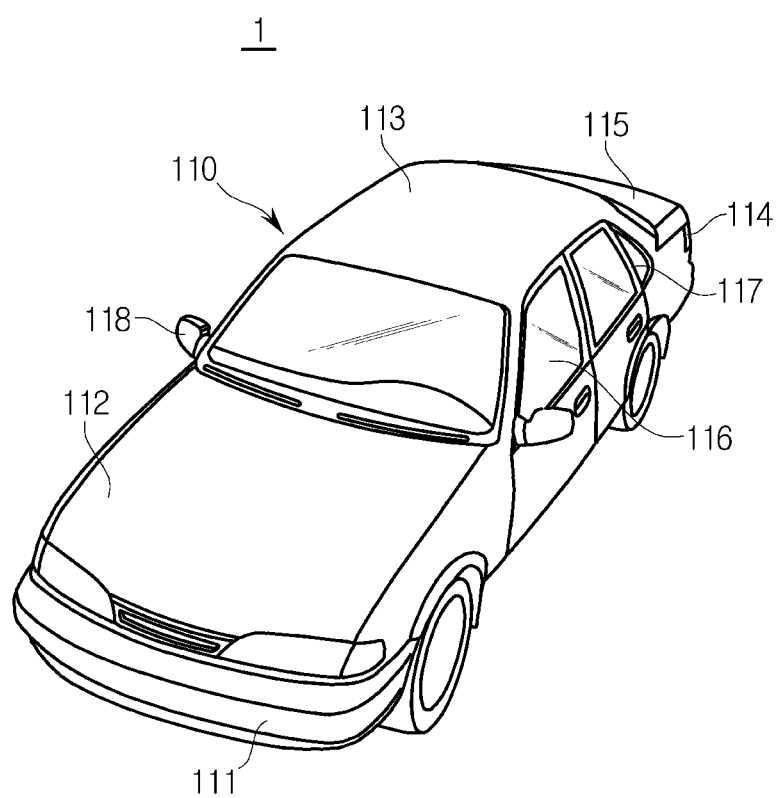
FIG. 1 is a perspective view of a vehicle according to an embodiment of the present disclosure.

Reference will now be made in detail to the embodiments of the present disclosure, examples of which are illustrated in the accompanying drawings, wherein like reference numerals refer to like elements throughout.

Figure 2:
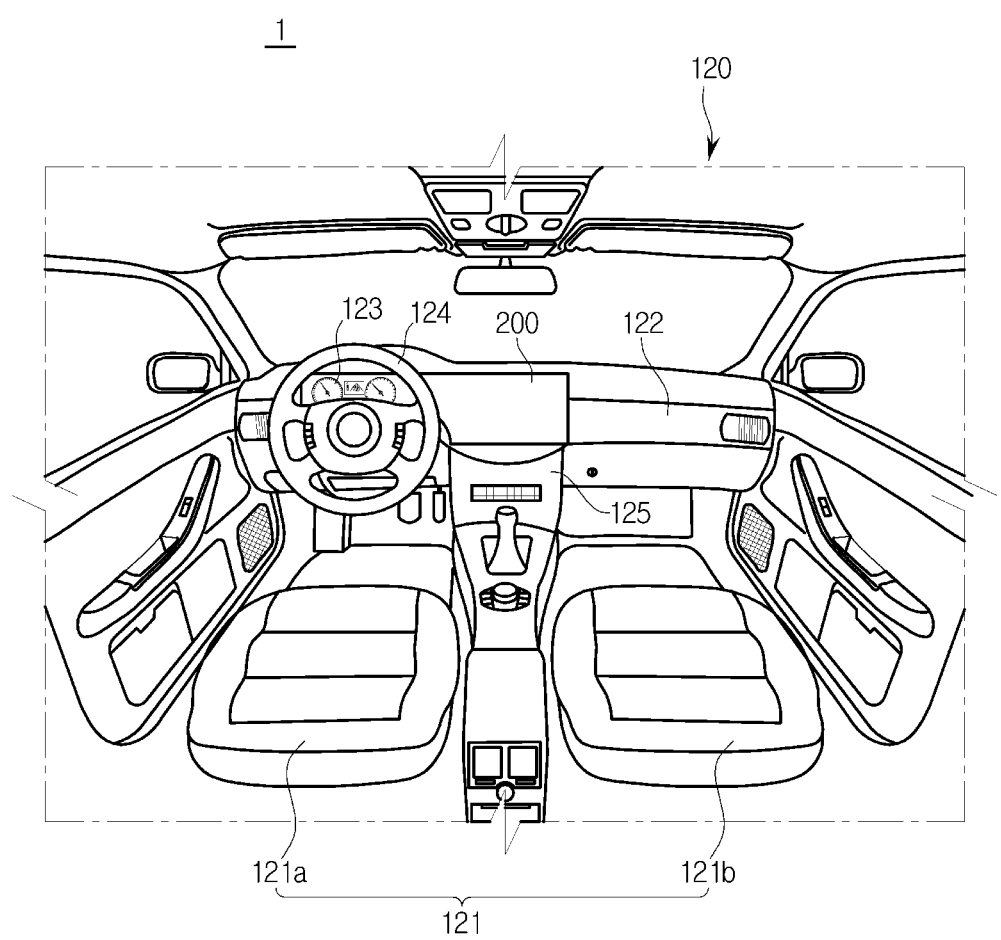
FIG. 2 illustrates an inside of a vehicle according to an embodiment of the present disclosure, when seen from a back seat of the vehicle.
Figure 3:
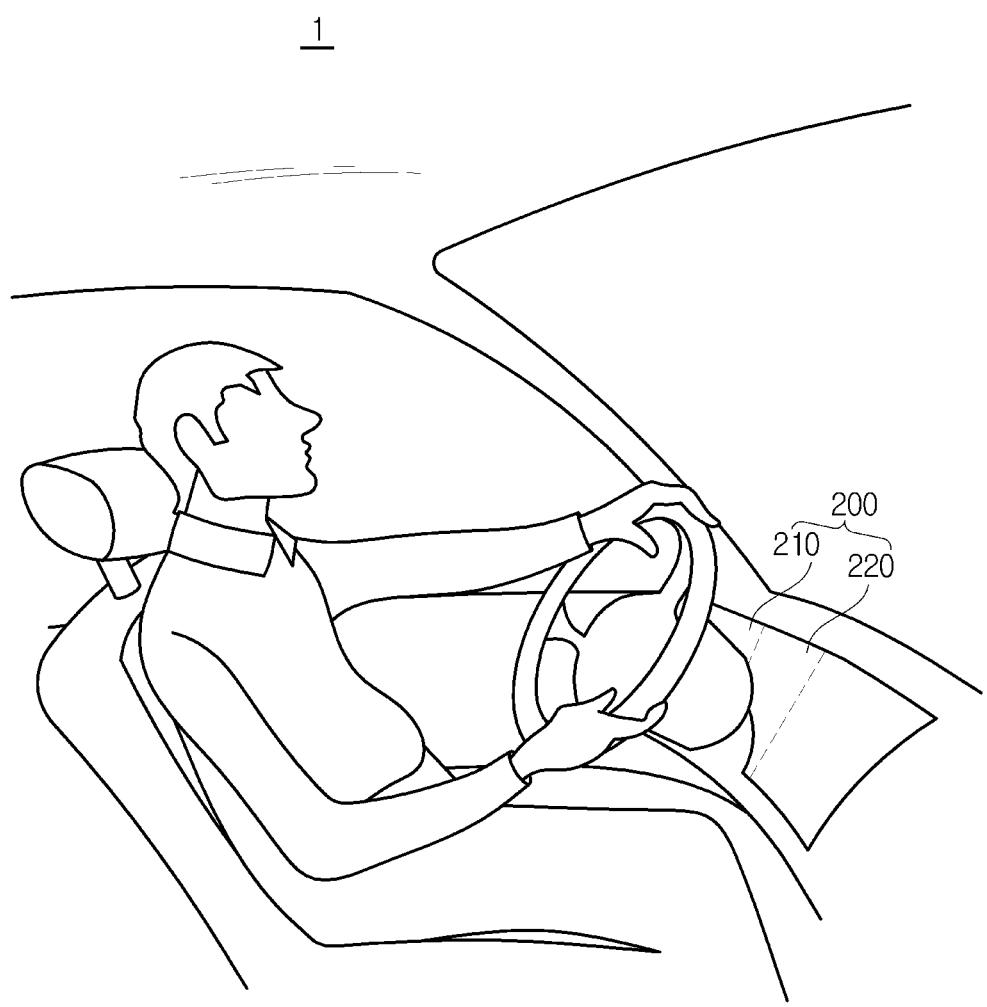
FIG. 3 illustrates an inside of a vehicle according to an embodiment of the present disclosure, when seen from a passenger seat of the vehicle.

FIG. 1 is a perspective view of a vehicle according to an embodiment of the present disclosure, FIG. 2 illustrates the inside of the vehicle according to an embodiment of the present disclosure, when seen from a back seat of the vehicle, and FIG. 3 illustrates the inside of the vehicle according to an embodiment of the present disclosure, when seen from a passenger seat of the vehicle.

The vehicle drives wheels to move on a road in order to carry persons or goods.

Referring to FIG. 1, a vehicle 1 may include a body having an interior part 120 and an exterior part 110, and a chassis which is the remaining part except for the body and in which a mechanical system required for driving is installed.

As illustrated in FIG. 1, the exterior part 110 of the body may include a front panel 111, a hood 112, a loop panel 113, a rear panel 114, a trunk 115, and front, rear, left, and right doors 116.

Also, the exterior part 110 of the body may further include a plurality of fillers 117 that are provided in borders between the front panel 111, the hood 112, the loop panel 113, the rear panel 114, the trunk 115, and the front, rear, left, and right doors 116.

Also, the exterior part 110 of the body may further include a plurality of window glasses installed in the front, rear, left, and right doors 116, a plurality of quarter window glasses installed between the fillers 117 wherein the quarter window glasses do not open, a rear window glass installed in the back part of the body, and a front window glass installed in the front part of the body.

The exterior part 110 of the body may further include a plurality of side mirrors 118 that provide a driver with rear views.

As shown in FIG. 2, the interior part 120 of the body may include a plurality of seats 121 in which passengers sit, a dashboard 122, an instrument panel (that is, a cluster 123) that is installed in the dashboard 122 and output driving-related information, a steering wheel 124 to control a movement direction of the vehicle 1, and a center fascia 125 including an audio system and blades of an air conditioner, wherein the cluster 123 may include a speedometer, a fuel gauge, an automatic transmission selection lever lamp, a tachometer, and a trip meter.

The seats 121 may include a driver seat 121a in which a driver sits, a passenger seat 121b in which a passenger sits, and a back seat (not shown) that is provided in the back part inside the vehicle 1.

The cluster 123 may be implemented in a digital fashion. The cluster 123 may include a first user interface, and the first user interface may display information of a tachometer, a speedometer, a fuel gauge, an automatic transmission selection lever, and a trip meter.

The center fascia 125 may be located in the dashboard 122 between the driver seat 121a and the passenger's seat 121b, and include a control panel to control an audio system, an air conditioner, and a heater.

In the center fascia 125, a ventilator, a cigar jack, and an Audio Video Navigation (AVN) system may be installed.

The center fascia 125 may further include a second user interface to receive information input through a touch operation and to display various information. The second user interface may function as a control panel to control the audio system, the air conditioner, and the heater, and also perform an AVN function.

The chassis of the vehicle 1 may include a power generation system, a power transfer system, a driving system, a steering system, a brake system, a suspension system, a transmission system, a fuel system, and front, rear, left, and right wheels.

Also, the vehicle 1 may include various safety systems to ensure a driver and passengers' safety.

The safety systems may include an airbag system to ensure a driver and passengers' safety upon collision, and an electronic stability control (ESC) system to avoid loss of control of the vehicle 1 when the vehicle 1 accelerates or corners.

Also, the vehicle 1 may further include a proximity sensor to sense an obstacle or another vehicle in the rear or side of the vehicle 1, and a rain sensor to determine whether it rains and to sense an amount of rainfall.

In addition, the vehicle 1 may further include a hands-free system to improve a driver's convenience, a global positioning system (GPS), an audio system, a Bluetooth device, and a rear camera.

As shown in FIG. 3, a user interface apparatus 200 may extend from the cluster 123 which is the left portion of the dashboard 122 to the center fascia 125 which is the center portion of the dashboard 122.

The vehicle 1 may include the user interface apparatus 200 into which a first user interface 210 to output information of the cluster 123 and a second user interface 220 to input/output information of functions that have been manipulated through the center fascia 125 are integrated.

More specifically, the first user interface 210 may output driving information of the vehicle 1, and the second user interface 220 may receive operation commands from the audio system, the air conditioner, and the AVN system that perform additional functions of the vehicle 1, and selectively display operation information according to the operation commands.

If a function whose information is to be additionally displayed on the first user interface 210 is selected, the user interface apparatus 200 may enable the first user interface 210 to display information of the selected function, and the second user interface 220 to display information of the previous function, which has been displayed on the first user interface 210.

Also, if a function whose information is to be deleted from among information displayed on the first user interface 210 is selected, the user interface apparatus 200 may enable the second user interface 220 to display information of the selected function, and the first user interface 210 to display information of a predetermined function.

Herein, receiving information to be added to or deleted from the first user interface 210 may include receiving at least one of a signal regarding a location at which a touch input is applied on a touch panel, a signal regarding a direction in which a touch input is applied on the touch panel, and a signal regarding a gesture that is applied on the touch panel.

A control configuration of the user interface apparatus 200 will be described with reference to FIG. 4, below.

Figure 4:
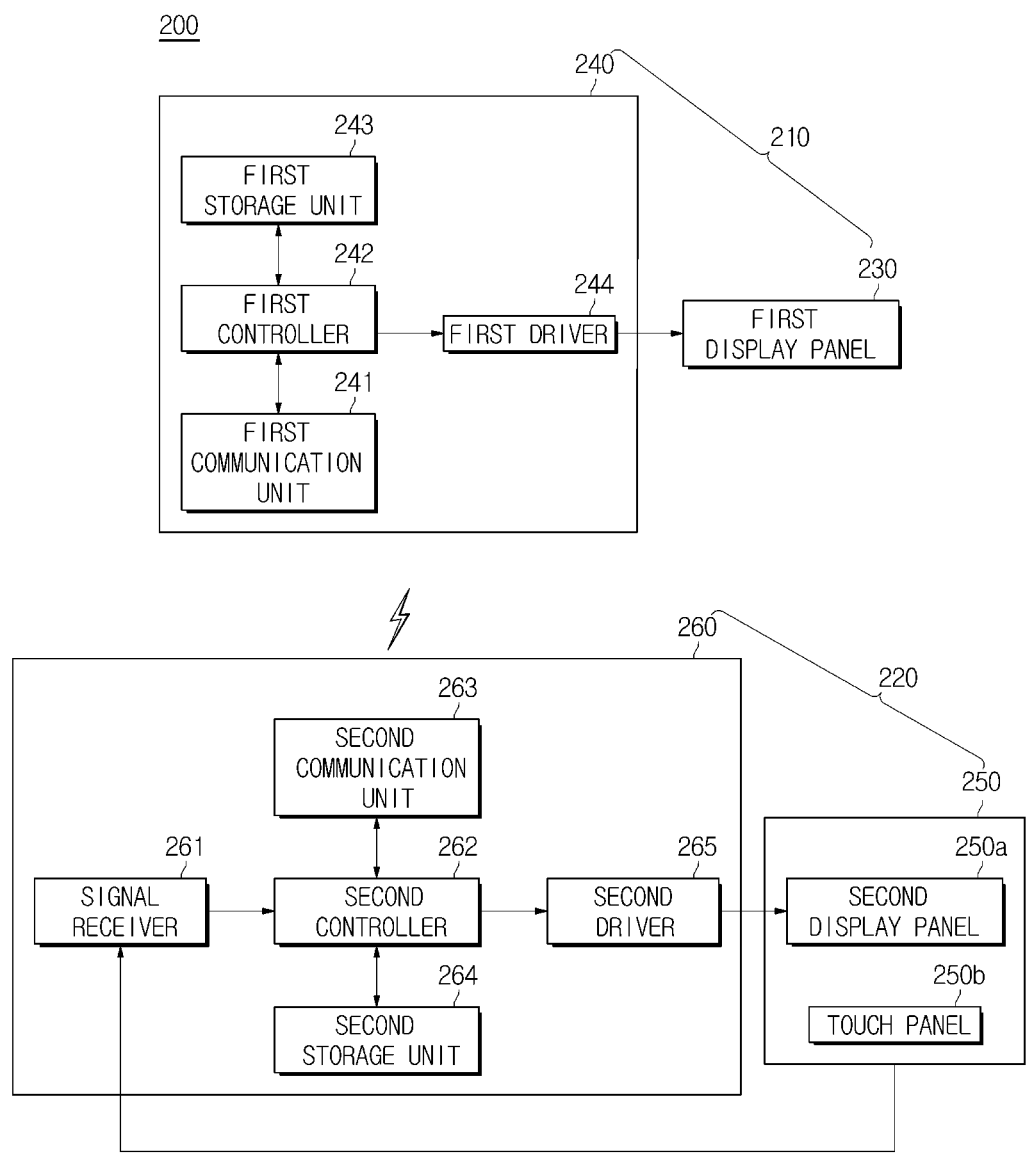
FIG. 4 is a control block diagram of a user interface apparatus installed in a vehicle, according to an embodiment of the present disclosure.

FIG. 4 is a control block diagram of the user interface apparatus 200 installed in the vehicle 1, according to an embodiment of the present disclosure.

The first user interface 210 further includes a first display panel 230 and a first driving module 240 to drive the first display panel 230, wherein the first display panel 230 may be a flat panel, such as a liquid crystal display (LCD), a plasma display panel (PDP), and an organic light emitting diode (OLED).

The second user interface 220 includes a second display panel 250a and a touch panel 250b to receive touch signals, and further includes a second driving module 260 to drive the second display panel 250a, wherein the second display panel 250a may be a flat panel, such as a LCD, a PDP, and an OLED, and the second display panel 250a and the touch panel 250b may configure a touch screen 250.

The first driving module 240 and the second driving module 260 may be connected to each other through wired or wireless communication to receive/transmit information from/to each other, and drive the respective display panels 230 and 250b based on the received information.

The first driving module 240 may include a first communication unit 241, a first controller 242, a first storage unit 243, and a first driver 244.

The first communication unit 241 may receive information about a sliding direction and information of a selected function, transmitted from the second driving module 260, and may transfer the received information to the first controller 242.

The first controller 242 may receive sensing information from various sensors (not shown) installed in the vehicle 1 during driving, determine driving information corresponding to the received sensing information, and control the first display panel 230 to display the determined driving information such that essential driving information for a driver and optional driving information for the driver are respectively displayed in different areas of the first display panel 230.

Driving information that is displayed on the first display panel 230 may include speed information and revolutions per minute (RPM) information.

The essential driving information for the driver may be information essential for driving safety among information that needs to be provided to the driver, and the optional driving information for the driver may be information that does little influence safety although it is not temporarily provided to the driver, among the information that needs to be provided to the driver. For example, the optional driving information may be RPM.

That is, the first controller 242 may enable the essential driving information to be displayed in a static area of the first display panel 230, and the optional driving information to be displayed in a variable area of the first display panel 230.

For example, the first controller 242 may enable predetermined driving information to be displayed fixedly in the static area of the first display panel 230, and driving information and at least one guest information to be changeably displayed in the variable area of the first display panel 230.

Driving information that is displayed in the variable area of the first display panel 230 may be referred to as host information.

The guest information is information of a function that is displayed on the second display panel 250a of the second user interface 220. The guest information may include information of a navigation function, information of a music play function, information of a radio function, information of an air conditioning function, and information of a phone function.

Accordingly the first controller 242 may change host information displayed in the variable area of the first display panel 230 to first guest information, additionally display second guest information in the variable area of the first display panel 230, or change first guest information displayed in the variable area of the first display panel 230 to host information, based on a direction indicated by a received sliding signal.

An example of a control configuration of the first controller 242 will be described below.

If a signal representing sliding in a first direction and guest information are received when host information is displayed in the variable area of the first display panel 230, the first controller 242 may control the first display panel 230 to display the guest information in the variable area.

If a signal representing sliding in the first direction and second guest information are received when first guest information is displayed in the variable area of the first display panel 230, the first controller 242 may control the first display panel 230 to display the second guest information in the variable area, in addition to the first guest information.

If a signal representing sliding in a second direction is received when the first guest information is displayed in the variable area of the first display panel 230, the first controller 242 may control the first display panel 230 to change the first guest information displayed in the variable area to the host information.

If a signal representing sliding in the second direction is received when the first guest information and the second guest information are displayed in the variable area of the first display panel 230, the first controller 242 may control the first display panel 230 to display only the first guest information in the variable area.

If any one of the first guest information and the second guest information is navigation information, the first controller 242 may give the navigation function high priority to first display the guest information which is the navigation information and to display the other guest information in an order in which linking commands are received.

The first controller 242 may control, when controlling a display of guest information, the first display panel 230 to display the same information as that of a function displayed on the second user interface 220, or to briefly display important information among the information of the function displayed on the second user interface 220.

Important information for each function may have been stored in advance.

The first controller 242 may control, when controlling a display of a plurality of guest information, the first display panel 230 to display the plurality of guest information sequentially in an order in which the plurality of guest information are selected.

The first storage unit 243 may store host information which is driving information to be displayed on the first display panel 230.

The first storage unit 243 may store a command for deleting/adding guest information, corresponding to a sliding direction indicated by a signal representing sliding.

For example, a signal representing sliding in the first direction may be a command for adding guest information, and a signal representing sliding in the second direction may be a command for deleting guest information.

The first storage unit 243 may store driving information that is displayed in the static area of the first display panel 230, and driving information that is displayed in the variable area of the first display panel 230.

The first driver 244 may drive the first display panel 230 to display images in the static area and the variable area, based on a command from the first controller 242.

The second driving module 260 may include a signal receiver 261, a second controller 262, a second communication unit 263, a second storage unit 264, and a second driver 265.

The signal receiver 261 may receive a touch signal generated when one or more touch inputs are applied on the touch panel 250b, and transfer the touch signal to the second controller 262 in order to detect locations of the touch inputs applied on the touch panel 250b.

The second driving module 260 may further include a detector (not shown) to detect locations of one or more touch inputs applied on the touch panel 250b. In this case, the touch panel 260b may transfer information about the locations of the touch inputs to the signal receiver 261.

The second controller 262 may determine the locations of the touch inputs and the number of the locations of the touch inputs, and determine whether the locations of the touch inputs move, based on the touch signal. If the second controller 262 determines that the locations of the touch inputs move, the second controller 262 may determine a direction in which the locations of the touch inputs move.

Herein, the direction in which the locations of the touch inputs move means a sliding direction.

The second driving module 260 may further include a detector (not shown) to detect a gesture of a hand moving over the touch panel 250b while being spaced a predetermined distance away from the touch panel 250b. In this case, the second controller 262 is configured to determine the gesture of the moving hand that is spaced the predetermined distance away from the touch panel 250b.

The gesture of the hand may include a shape of the hand or a direction in which the hand moves.

If the second controller 262 determines that a single touch input occurs or that a single touch input slides, the second controller 262 may execute a function to which the touch input is applied.

Meanwhile, if the second controller 262 determines that multiple touch inputs slide, the second controller 262 may link information of a function to which the multiple touch inputs are applied, display the linked information of the function, and then execute the function.

Herein, the multiple touch inputs mean a plurality of touch inputs generated at the same time. In the current embodiment, it is assumed that three touch inputs are generated.

If the second controller 262 determines that the multiple touch inputs slide in the first direction, the second controller 262 may transfer information of a function corresponding to an area on which the multiple touch inputs are applied, and a signal representing sliding in the first direction, to the first driving module 240.

Meanwhile, if the second controller 262 determines that the multiple touch inputs slide in the second direction, the second controller 262 may transfer a signal representing sliding in the second direction to the first driving module 240.

Figure 5:
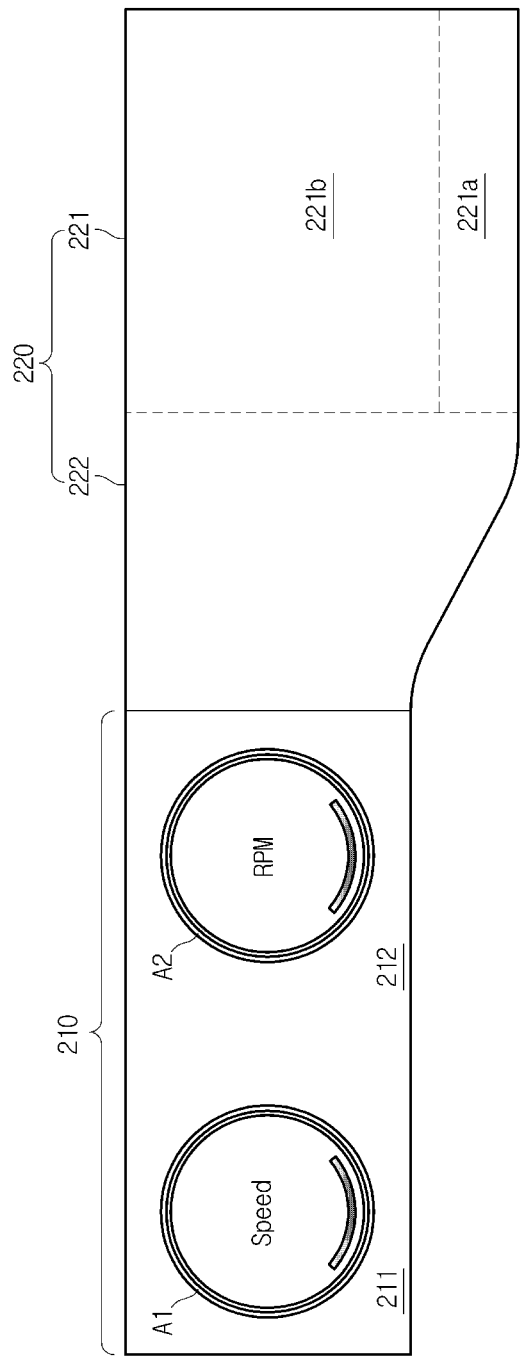
FIG. 5 illustrates an example of a display on a user interface apparatus according to an embodiment of the present disclosure.

The second controller 262 may control, when linking a display of functions, the second user interface 220 to display information of a function to which the multiple touch inputs are applied, in a first area 221 (see FIG. 5), and to display a list of the function in a second area 222 (see FIG. 5).

That is, the second controller 262 may display information of a plurality of linked functions in the second area 222 in an order in which the functions are selected, when controlling a display of the plurality of linked functions.

The second controller 262 may control the second interface 220 to display gesture information for controlling the function to which the multiple touch inputs are applied, in the first area 221.

The second controller 262 may control the second user interface 220 to display a menu with lists of a plurality of functions in the second area 222, when the second area 222 is touched for a predetermined time period or more.

If a second function is selected when the first area 221 displays information of a first function, the second controller 262 may change an information image of the first function to an information image of the second function.

Alternatively, if a second function is selected when the first area 221 displays information of a first function, the second controller 262 may overlap an information image of the second function with an information image of the first function.

The second communication unit 263 may transmit a signal representing a sliding direction and information of a function to which multiple touch inputs are applied.

The second storage unit 264 may store location information of the first area 221 that displays information of various functions as images, and location information of the second area 222 that displays linking information with respect to the first user interface 210.

The second storage unit 264 may store location information of images that are displayed on the second display panel 250a.

The second storage unit 264 may store information about gestures for linking a display of functions. For example, gestures for linking a display of functions may include a gesture in which multiple touch inputs slide.

Also, the second storage unit 264 may store gestures corresponding to control commands for the individual functions.

For example, gestures corresponding to control commands for a music play function may include a gesture corresponding to a left arrow for playing the previous music, a gesture corresponding to a right arrow for playing the next music, a gesture corresponding to an up arrow for playing/pausing music, and a gesture corresponding to a down arrow for stopping playing music. Herein, the direction of the arrow may be a sliding direction.

The second driver 265 may drive the second display panel 250*a* to display images in the first area 221 and the second area 222, respectively, based on a command from the second controller 262.

The first driving module 240 and the second driving module 260 may be integrated into a driving module. In this case, the user interface apparatus 200 may control the first display panel 230, the second display panel 250*a*, and the touch panel 250*b* using the driving module, without having to perform communication.

A display area of the user interface apparatus 200 and a method of inputting operation commands through the user interface apparatus 200 will be described with reference to FIGS. 5, 6, and 7, below.

FIG. 5 illustrates an example of a display on the user interface apparatus 200 according to an embodiment of the present disclosure.

As shown in FIG. 5, the user interface apparatus 200 may include the first user interface 210 and the second user interface 220.

A screen of the first user interface 210 may include the static area 211 to statically display predetermined driving information, and the variable area 212 to display driving information that is different from that displayed in the static area 211.

That is, the static area 211 may display an image A1 of speed information of the vehicle 1 (shown in FIG. 1), and the variable area 212 may display an image A2 of RPM information of the vehicle 1.

The variable area 212 may changeably display information of a function selected by a driver.

In the current embodiment, driving information that is displayed in the variable area 212 is referred to as host information, and information of an additional function that is displayed in the variable area 212 is referred to as guest information.

A screen of the second user interface 220 may include the first area 221 to display information of an additional function, and the second area 222 to display linking information.

The additional function may include a navigation function, a music play function, a radio function, an air conditioning function, and a phone function.

Also, the first area 221 of the second user interface 220 may be divided into a button area 221*a* to display one or more buttons for controlling the air conditioning function and so on, and a function display area 221*b* to display information of an additional function.

Figure 6:
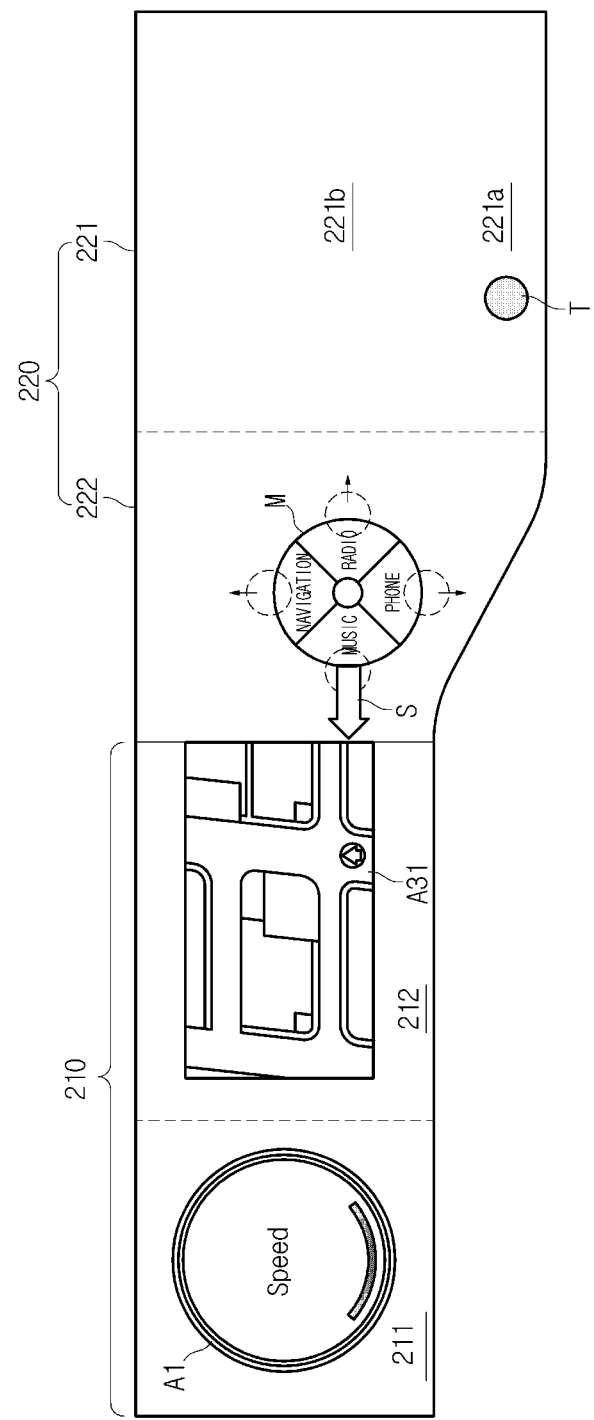
FIGS. 6 and 7 illustrate user interfaces for describing examples of operations of a user interface apparatus according to an embodiment of the present disclosure.
Figure 7:
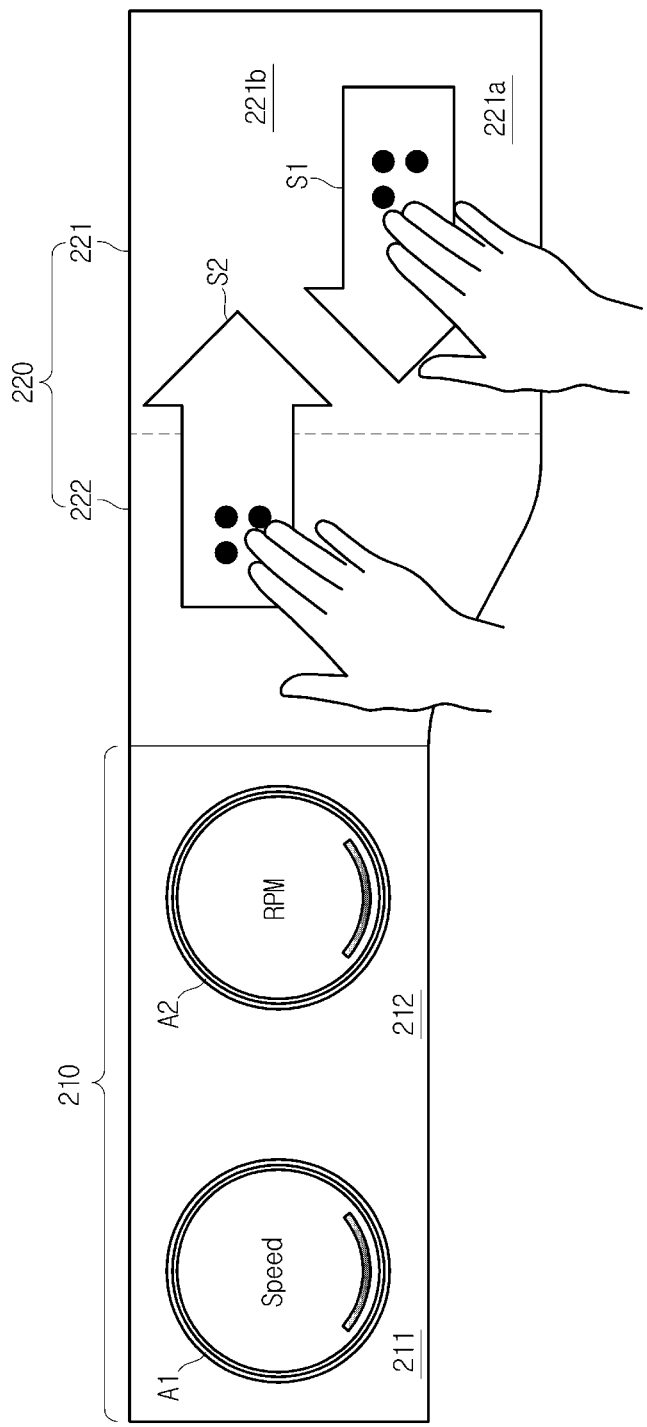

FIGS. 6 and 7 illustrate a user interface for describing examples of operations of the user interface apparatus 200 according to an embodiment of the present disclosure.

As shown in FIG. 6, the first user interface 210 may display an image A1 of speed information of the vehicle 1 in the static area 211, and an image A31 of navigation information in the variable area 212.

The second user interface 220 may determine, if a single touch input (I) is applied on the first area 221, a function corresponding to a location at which the touch input is applied, and display information of the determined function.

The second user interface 220 may display, if a single touch input is applied on the second area 222 for a predetermined time period or more, a menu M in the second area 222.

The second user interface 220 may determine whether a touch input is applied while the menu M is displayed in the second area 222. If the second user interface 220 determines that a touch input is applied while the menu is displayed in the second area 222, the second user interface 220 may display information of a function corresponding to a location at which the touch input is applied, and enable the function to be executed.

That is, if a function listed in the menu M displayed in the second area 222 is selected by a single touch input or by a touch-and-slide input, the second user interface 220 may determine the function corresponding to a location at which the touch input is applied, and display information of the determined function in the first area 221.

As shown in FIG. 7, the first user interface 210 may display an image A1 of speed information of the vehicle 1 in the static area 211, and an image A2 of RPM information in the variable area 212.

If the second user interface 220 determines that multiple touch inputs slide in a first direction S1, the second user interface 220 may transmit information of a function corresponding to an area in which the multiple touch inputs are applied, together with a signal representing sliding in the first direction S1, to the first user interface 210. Then, the first user interface 210 may display the information of the function in the variable area 212.

Herein, the information of the function transmitted to the variable area 212 may be guest information that is displayed instead of the host information which is the RPM information.

If the second user interface 220 determines that multiple touch inputs slide in a second direction S2, the second user interface 220 may transmit a signal representing sliding in the second direction S2, to the first user interface 210. Then, the first user interface 210 is configured to delete information of a function displayed in the variable area 212.

That is, the first user interface 210 may stop displaying the information of the function in the variable area 212.

The signal representing sliding in the first direction S1 is a command for adding guest information, and the signal representing sliding in the second direction S2 is a command for deleting guest information.

Also, the second user interface 220 may recognize a linking command, based on a gesture of a hand and a movement direction of the hand, the hand spaced a predetermined distance away from the touch panel 250*b* (as shown in FIG. 4), instead of recognizing a linking command through sliding of multiple touch inputs.

An example of the operation of the user interface apparatus 200 will be described with reference to FIGS. 8A to 10C, below.

FIGS. 8A to 8I illustrate user interfaces for describing examples of methods of displaying information of a function selected by a user on the first user interface 210 of the user interface apparatus 200 according to an embodiment of the present disclosure.

Figure 8A:
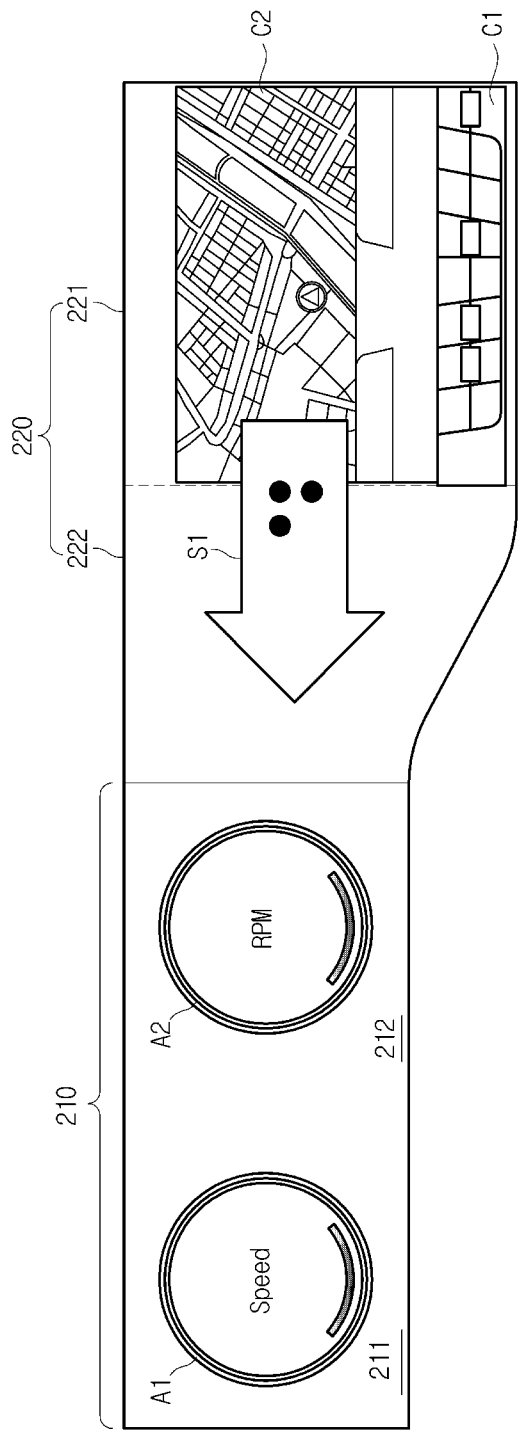

As shown in FIG. 8A, the first user interface 210 may display an image A1 of speed information in the static area 211 and an image A2 of RPM information in the variable area 212.

The second user interface 220 may display a plurality of buttons C1 for controlling an air conditioning function and additional functions in the button area 221a (shown in FIG. 5) of the first area 221, and display information of a function being currently executed in the function display area 221b (shown in FIG. 5) of the first area 221.

For example, if a navigation function is executed, the second user interface 220 may display an image C2 of the navigation function in the function display area 221b of the first area 221.

The second user interface 220 may receive a signal representing sliding of multiple touch inputs in the first direction S1.

Then, the user interface apparatus 200 may offer a graphic effect like an image of a function selected by a user that is blown from the second user interface 220 to the first user interface 210. At this time, the user interface apparatus 200 may make sound.

Figure 8B:
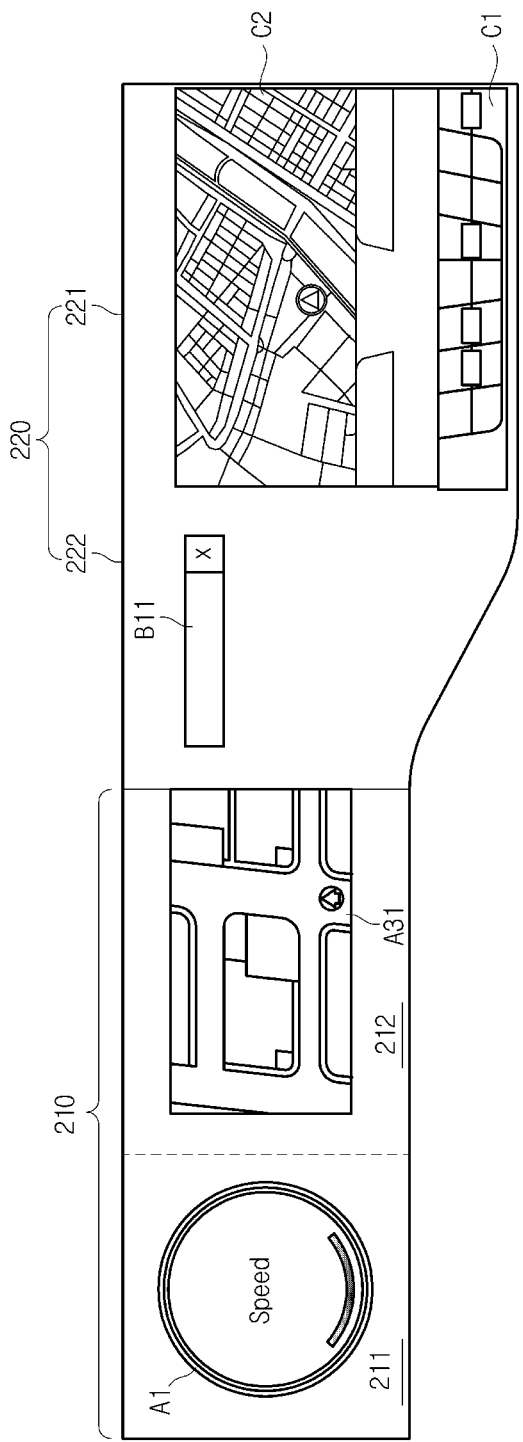

As shown in FIG. 8B, when the signal representing sliding of multiple touch inputs in the first direction S1 is received, the second user interface 220 may transfer the signal representing sliding in the first direction S1 and information of the function being currently executed, to the first user interface 210, create a list of linking information, and display an image B11 of the created list in the second area 222.

The first user interface 210 may delete the image A2 of the host information displayed in the variable area 212, and display an image A31 of the information of the function received from the second user interface 220, in the variable area 212.

At this time, the image A31 of the navigation function that is displayed in the variable area 212 of the first user interface 210 may be more briefly represented than the image C2 of the navigation function displayed in the function display area 221b of the second user interface 220.

Also, when information of the navigation function is displayed in the variable area 212 of the first user interface 210, traffic enforcement information, an estimated time of arrival, a destination, a remaining distance, and so on may be further displayed together with a map.

Also, the information of the navigation function that is displayed in the variable area 212 of the first user interface 210 may be a close-range map.

Figure 8D:
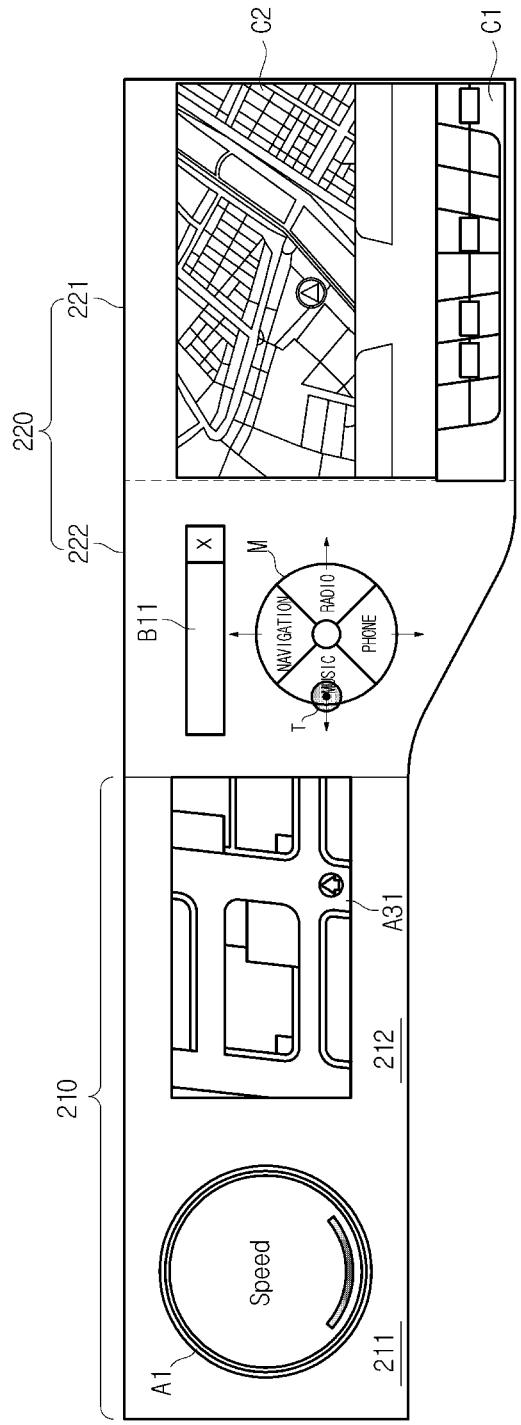

As shown in FIG. 8C, if the second area 222 is touched for a predetermined time period or more (input T), the second user interface 220 may display a menu M of a plurality of functions in the second area 222, as shown in FIG. 8D.

The second user interface 220 may display a plurality of gestures for selecting the respective functions, for example, in the form of arrows, together with the menu M.

Figure 8E:
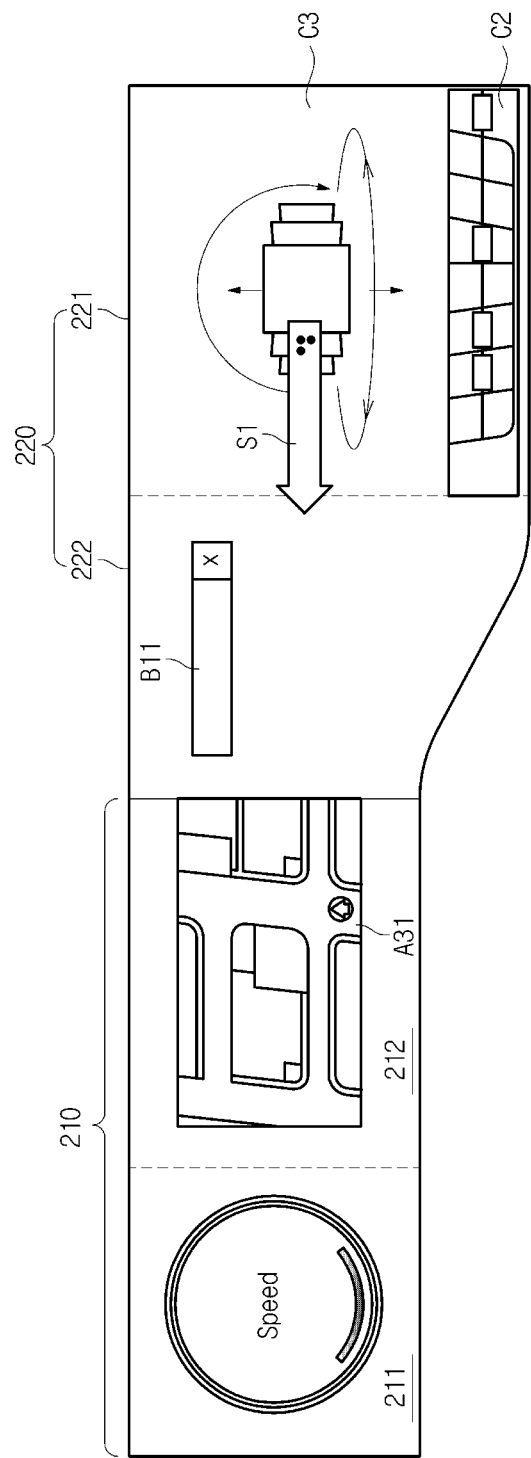

Thereafter, if a function (for example, a music play function) among the plurality of functions included in the menu M is touched (input T), the second user interface 220 may display an image C3 related to a music album and play in the function display area 221a of the first area 221, as shown in FIG. 8E.

Also, the second user interface 220 may overlap the image C3 of the music play function with the image C2 of the navigation function. Alternatively, the second user interface 220 may display the image C3 of the music play function after deleting the image C2 of the navigation function.

Figure 8F:
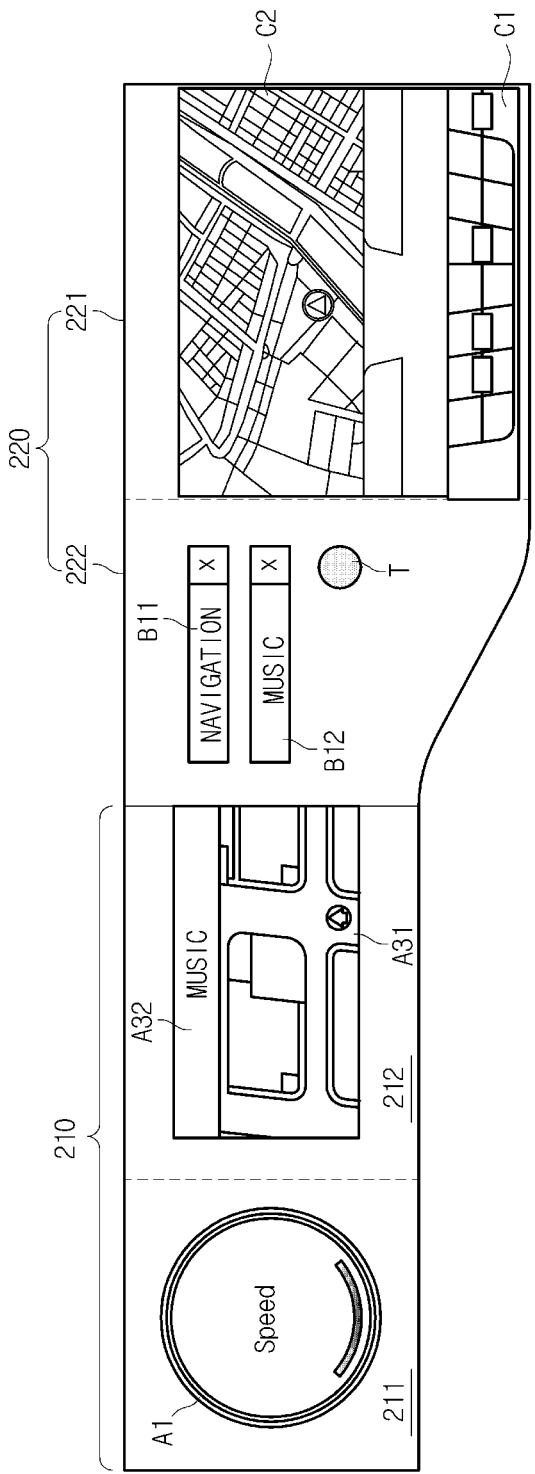

Then, if a signal representing sliding of multiple touch inputs in the first direction S1 is received, the second user interface 220 may transfer the signal representing sliding in the first direction S1 and information of the function to which the multiple touch inputs are applied, to the first user interface 210, create a list of linking information, and additionally display an image B12 of the created list in the second area 222, as shown in FIG. 8F. The image B12 of the list may further include a deletion button X.

The second user interface 220 may sequentially display lists of a plurality of linking information in the second area 222.

Herein, sequentially displaying the lists of the plurality of linking information may include displaying the lists of the plurality of linking information, from an upper area/part to a bottom part of second area 222.

For example, the second user interface 220 may display the list of the navigation function, which is first linked, in the upper part, and display the list of the music play function, which is linked later, below the list of the navigation function.

Herein, each list may be displayed in the form of a function name or an icon.

As shown in FIG. 8F, the first user interface 210 may additionally display an image A32 related to the music play function, in the variable area 212.

At this time, the first user interface 210 may sequentially display information of the added function, in the variable area 212.

Also, if the navigation function is included in a plurality of functions whose information are to be displayed in the variable area 212, the first user interface 210 may display information of the navigation function as a largest image, and display information of the remaining functions above the image of the navigation function, sequentially, in an order in which the functions are linked.

Images of the information of the plurality of functions may be sequentially displayed from the upper part to the lower part or from the left part to the right part.

If the second area 222 is touched for a predetermined time period or more (T), the second user interface 220 may display the menu M in the second area 222, as shown in FIG. 8G.

At this time, the second user interface 220 may display the menu M after deleting the lists displayed in the second area 222, or the second user interface 220 may overlap the menu M with the lists.

If a function (for example, a phone function) among a plurality of functions included in the menu M is touched (input T), the second user interface 220 may display an image C4 of the phone function in the function display area 221a of the first area 221, as shown in FIG. 8H.

At this time, the second user interface 220 may overlap the image C4 of the phone function with the image C2 of the navigation function, or the second user interface 220 may display the image C4 of the phone function after deleting the image C2 of the navigation function.

If multiple touch inputs slide in the first direction S1, the second user interface 220 may transfer a signal representing sliding in the first direction S1 and information of a function corresponding to an area on which the multiple touch inputs are applied, to the first user interface 210, create a list of linking information, and additionally display an image B12 of the created list in the second area 222.

The second user interface 220 may display the lists of linking information sequentially in the second area 222.

Figure 8I:
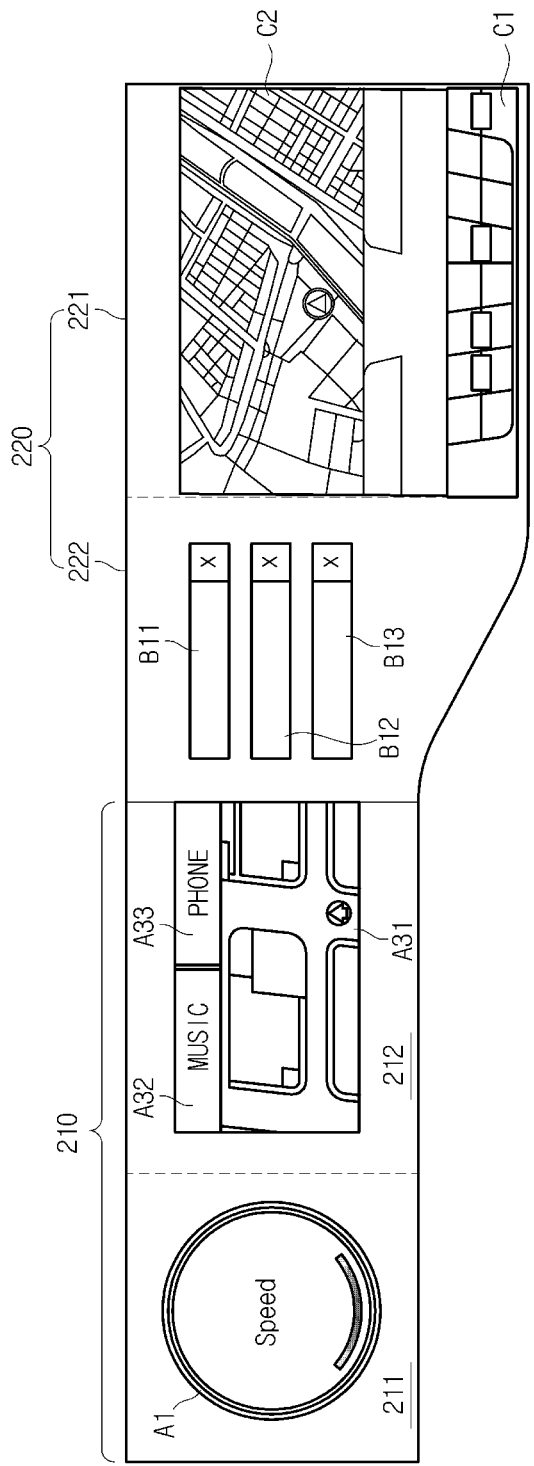

The first user interface 210 may additionally display an image A33 related to the phone function in the variable area 212, as shown in FIG. 8I.

At this time, the first user interface 210 may sequentially display information of the added functions in the variable area 212.

Also, if the navigation function is included in a plurality of functions whose information are to be displayed in the variable area 212, the first user interface 210 may display information of the navigation function as a largest image, and display information of the remaining functions above the image of the navigation function, sequentially, in an order in which the functions are linked.

Displaying the information of the remaining functions sequentially in the order in which the functions are linked may include displaying the information of the remaining functions sequentially from the left to the right.

If no navigation function is included in a plurality of functions whose information are to be displayed in the variable area 212, the first user interface 210 may display the information of the plurality of functions from the upper part to the bottom part or from the left part to the right part.

Figure 9A:
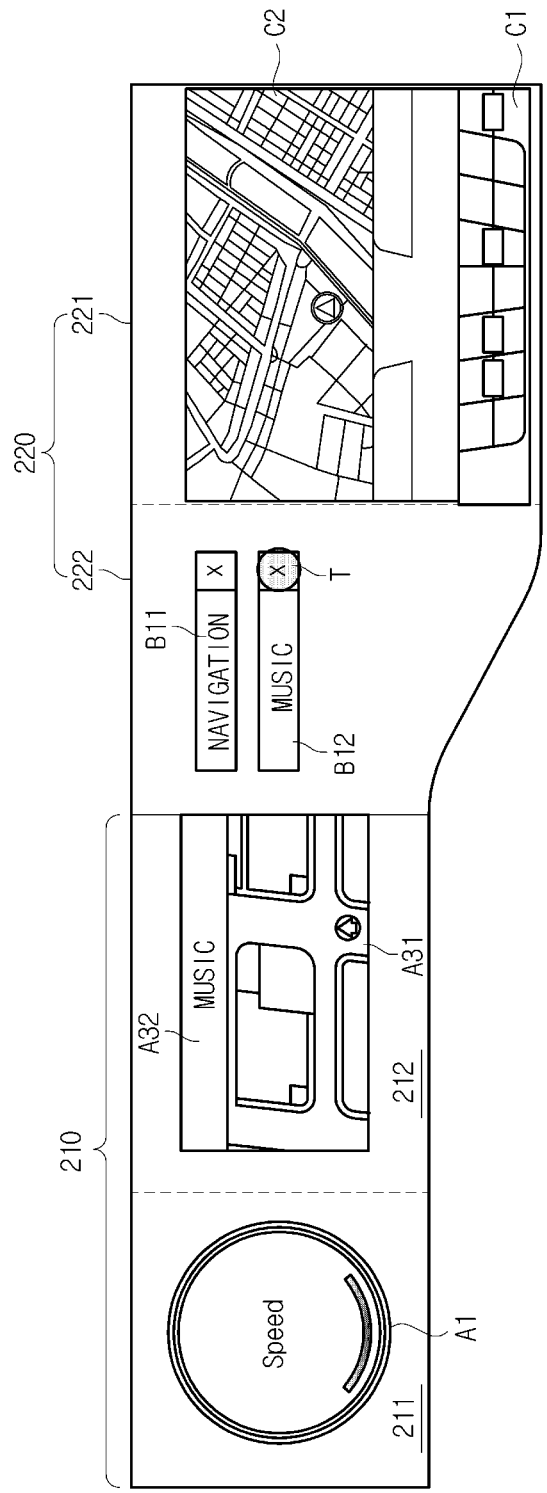
FIGS. 9A to 9C illustrate user interfaces for describing an example of a method of deleting information of a function displayed on a first user interface of a user interface apparatus according to an embodiment of the present disclosure.
Figure 9B:
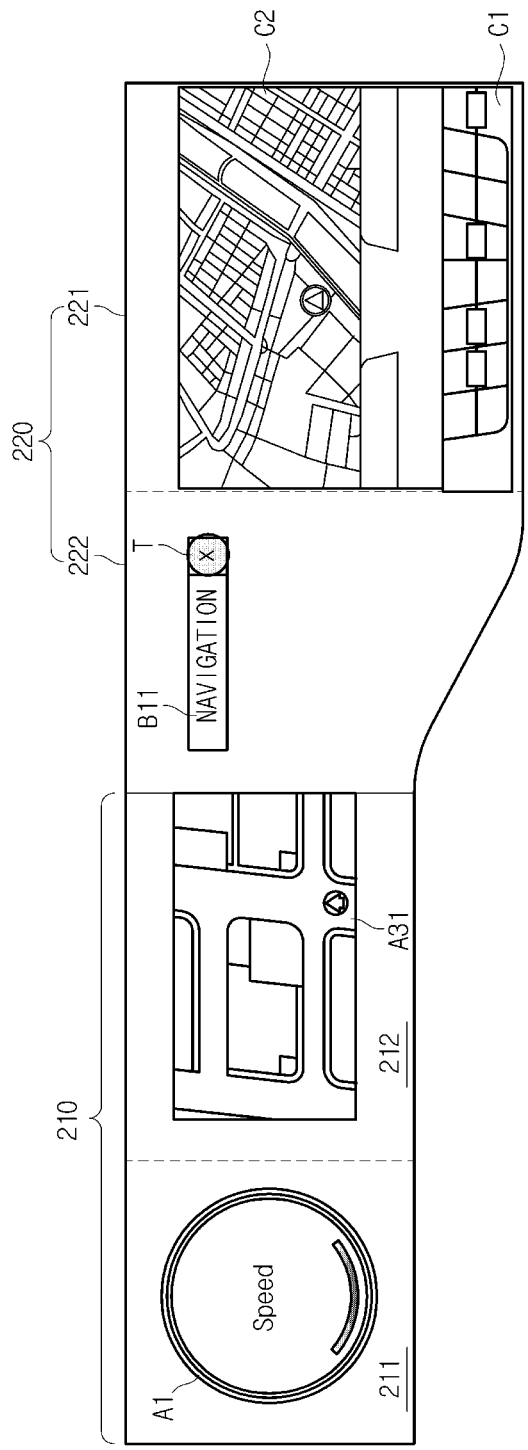
Figure 9C:
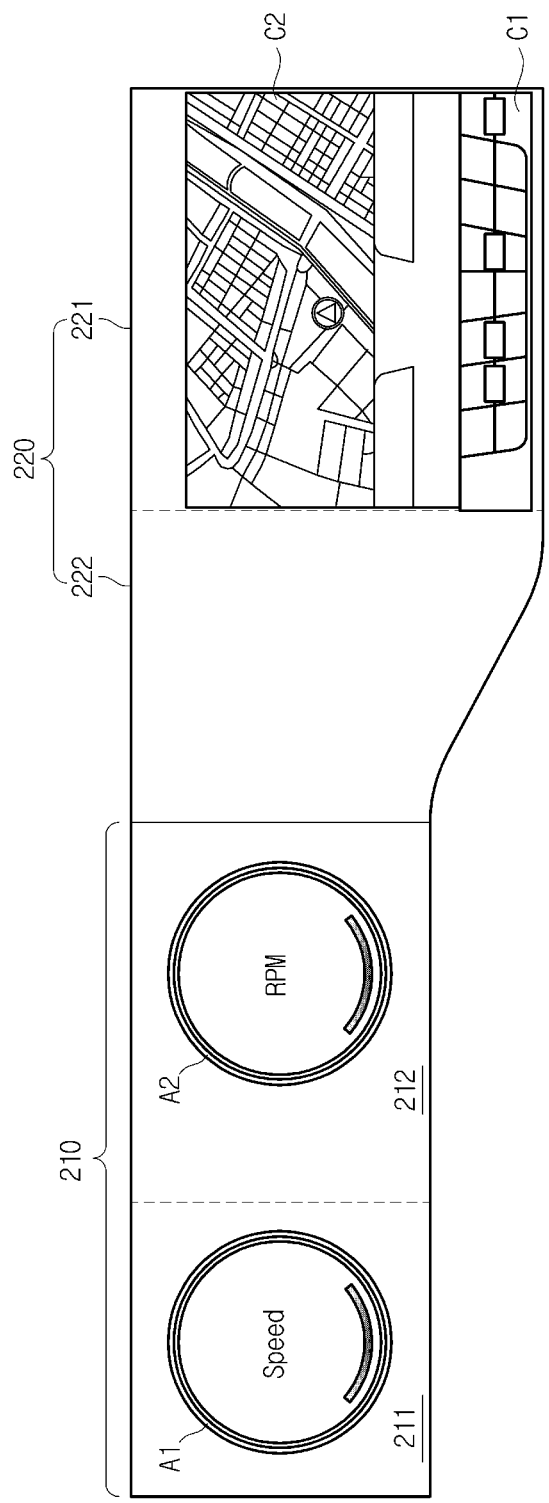

FIGS. 9A to 9C illustrate user interfaces for describing an example of a method of deleting information of a function displayed on the first user interface 210 of the user interface apparatus 200 according to an embodiment of the present disclosure.

As shown in FIG. 9A, the first user interface 210 displays an image A1 of driving information in the static area 211, and display an image A31 of a navigation function and an image A32 of a music play function, in the variable area 212. Also, the second user interface 220 displays an image C2 of the navigation function and an image C1 of buttons for controlling an air conditioning function, in the first area 221, and display lists of linking information in the second area 222.

In this state, if a deletion button X of the music list among the lists displayed in the second area 222 is touched (input T), the second user interface 220 may transmit a command for deleting the image A32 of the music play function, to the first user interface 210.

The second user interface 220 may delete the image B12 of the music list from the lists displayed in the second area 222, and display only the image B11 of the navigation list, as shown in FIG. 9B.

At this time, the first user interface 210 may delete the image A32 of the music play function displayed in the variable area 212, and display only the image A31 of the navigation function in the variable area 212.

In this state, if a deletion button X of the navigation list displayed in the second area 222 is touched (input T), the second user interface 220 may transfer a command for deleting the image A31 of the navigation function, to the first user interface 210.

Then, as shown in FIG. 9C, the second user interface 220 may delete the image B11 of the navigation list displayed in the second area 222, and the first user interface 210 may display an image A2 of driving information, which is host information, in the variable area 212.

That is, when there is no linking information with respect to the second user interface 220, the first user interface 210 may display the image A2 of the driving information, which is host information, in the variable area 212.

Figure 10B:
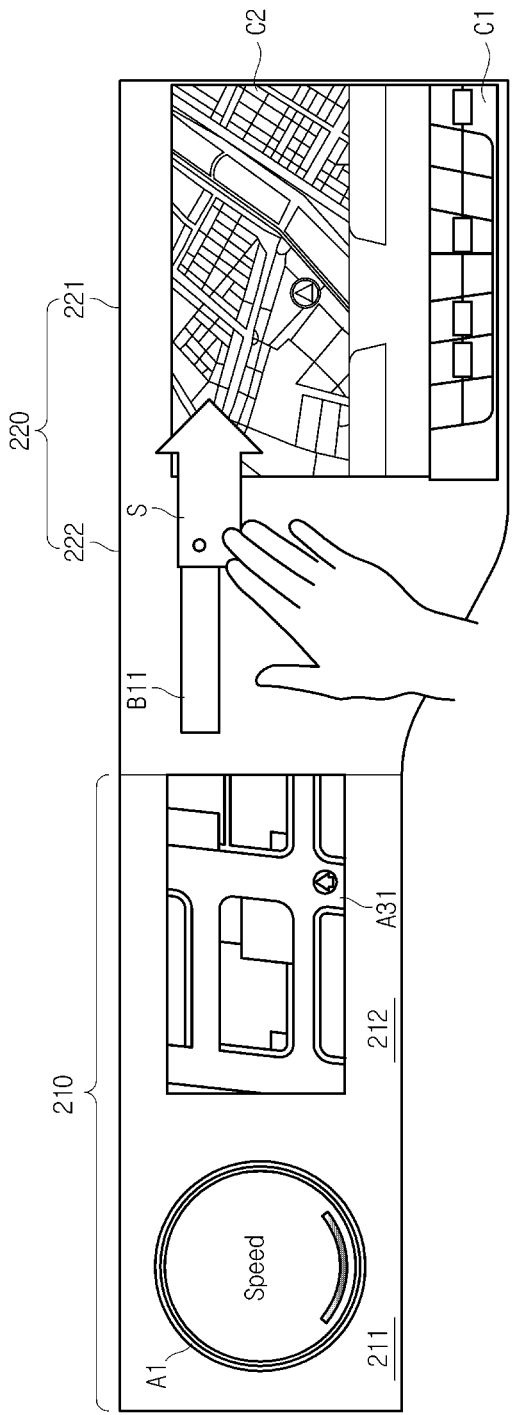
Figure 10C:
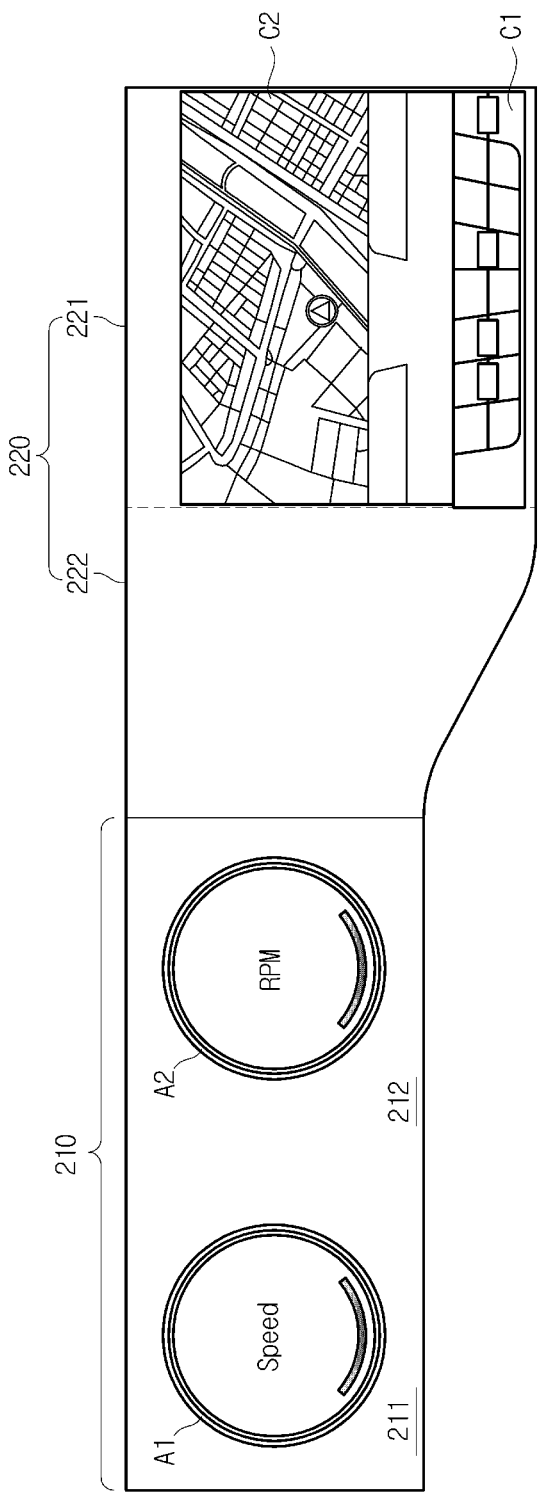

FIGS. 10A to 10C illustrate user interfaces for describing another exemplary embodiment of the method of deleting information of a function displayed on the first user interface 210 of the user interface apparatus 200 according to an embodiment of the present disclosure.

As shown in FIG. 10A, the first user interface 210 may display an image A1 of driving information in the static area 211, and display an image A31 of a navigation function and an image A32 of a music play function, in the variable area 212. Also, the second user interface 220 may display an image C2 of the navigation function and an image C1 of buttons for controlling an air conditioning function, in the first area 221, and display lists B11 and B12 of linking information in the second area 222.

If the list B12 (for example, a music list) of the lists B11 and B12 displayed in the second area 212 is touched to slide, the second user interface 220 may transmit a command for deleting the image A32 of the music play function, to the first user interface 210.

As shown in FIG. 10B, the second user interface 220 may delete the music list B12 from among the lists B11 and B12 displayed in the second area 222, and display only the navigation list B11 in the second area 222.

At this time, the first user interface 210 may delete the image A32 of the music play function displayed in the variable area 212, and display only the image A31 of the navigation function in the variable area 212.

If the navigation list B11 displayed in the second area 222 is touched to slide, the second user interface 220 may transmit a command for deleting the image A31 of the navigation function, to the first user interface 210.

Then, the second user interface 220 may delete the navigation list B11 displayed in the second area 222, and the first user interface 210 may display an image A2 of driving information which is host information, in the variable area 212, as shown in FIG. 10C.

That is, if there is no linking information with respect to the second user interface 220, the first user interface 210 may display the image A2 of driving information which is host information, in the variable area 212.

FIGS. 11A to 11D illustrate user interfaces for describing an exemplary embodiment of a method of controlling an air conditioning function using the user interface apparatus 200 according to an embodiment of the present disclosure.

Figure 11A:
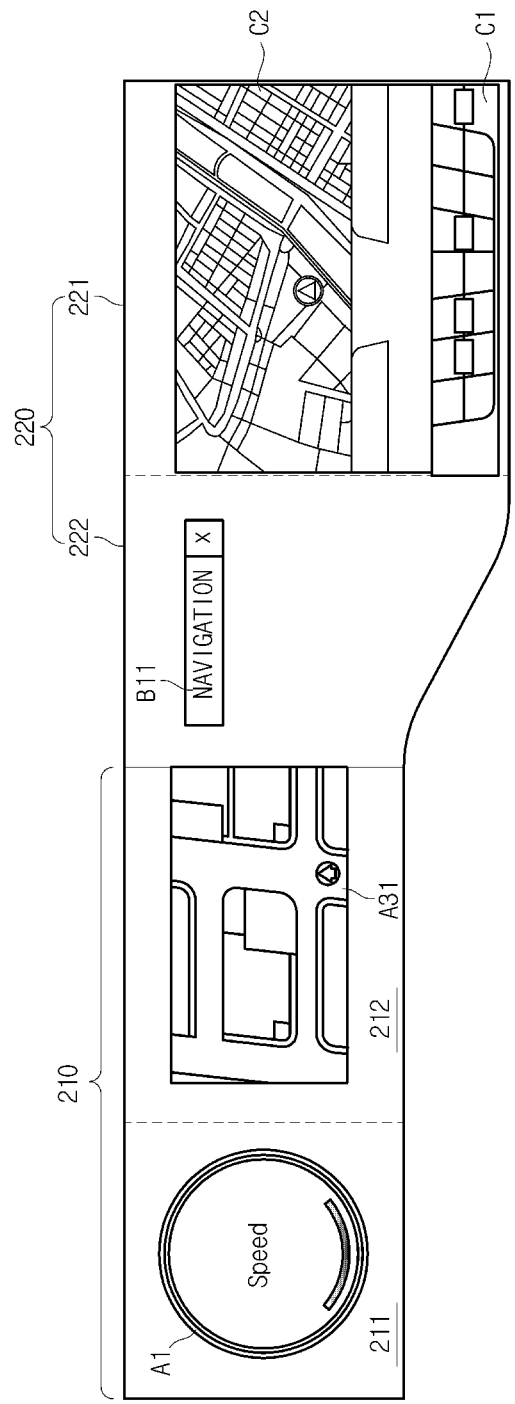
FIGS. 11A to 11D illustrate user interfaces for describing an example of a method of controlling an air conditioning function using a user interface apparatus according to an embodiment of the present disclosure.

As shown in FIG. 11A, the first user interface 210 may display an image A1 of driving information in the static area 211, and display an image A31 of a navigation function in the variable area 212. Also, the second user interface 220 may display an image C2 of the navigation function and an image C1 of buttons for controlling the air conditioning function, in the first area 221, and display a list B11 of linking information in the second area 222.

Figure 11B:
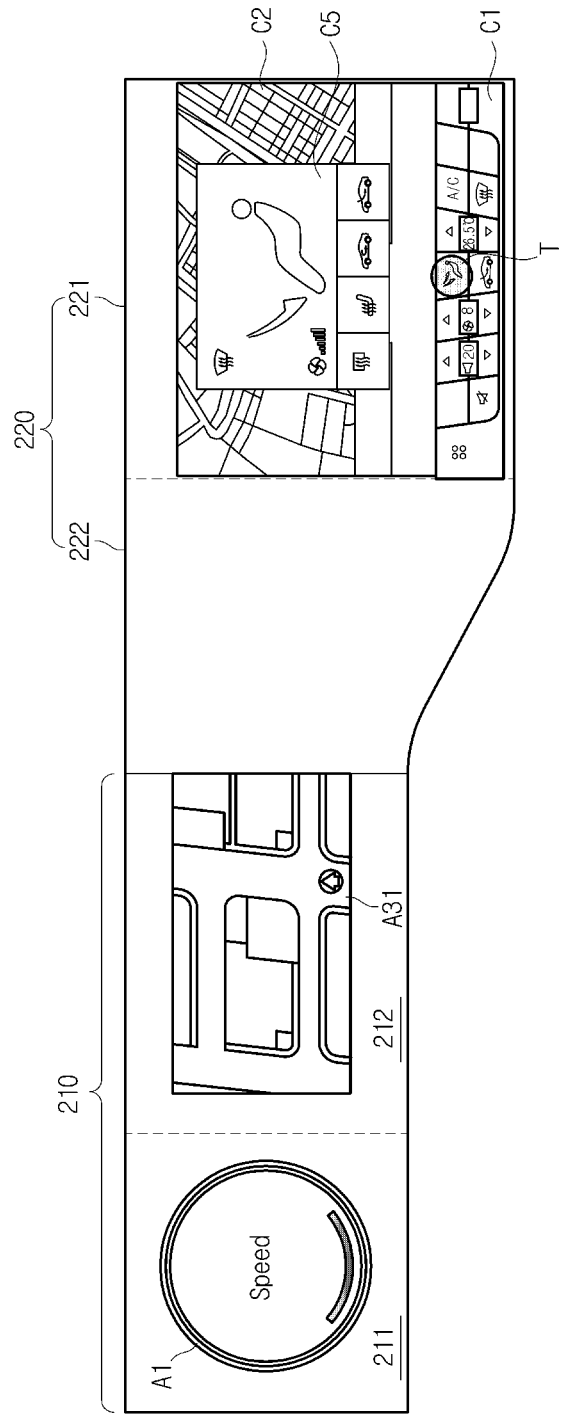

If a button for controlling the air conditioning function in the button area 221a (as shown in FIG. 5) of the first area 221 is touched (input T), the second user interface 220 may overlap an image C5 of the air conditioning function with the image C2 of the navigation function displayed in the first area 221, as shown in FIG. 11B.

At this time, the second area 222 of the second user interface 220 and the variable area 212 of the first user interface 220 may maintain displayed images as they are.

Figure 11C:
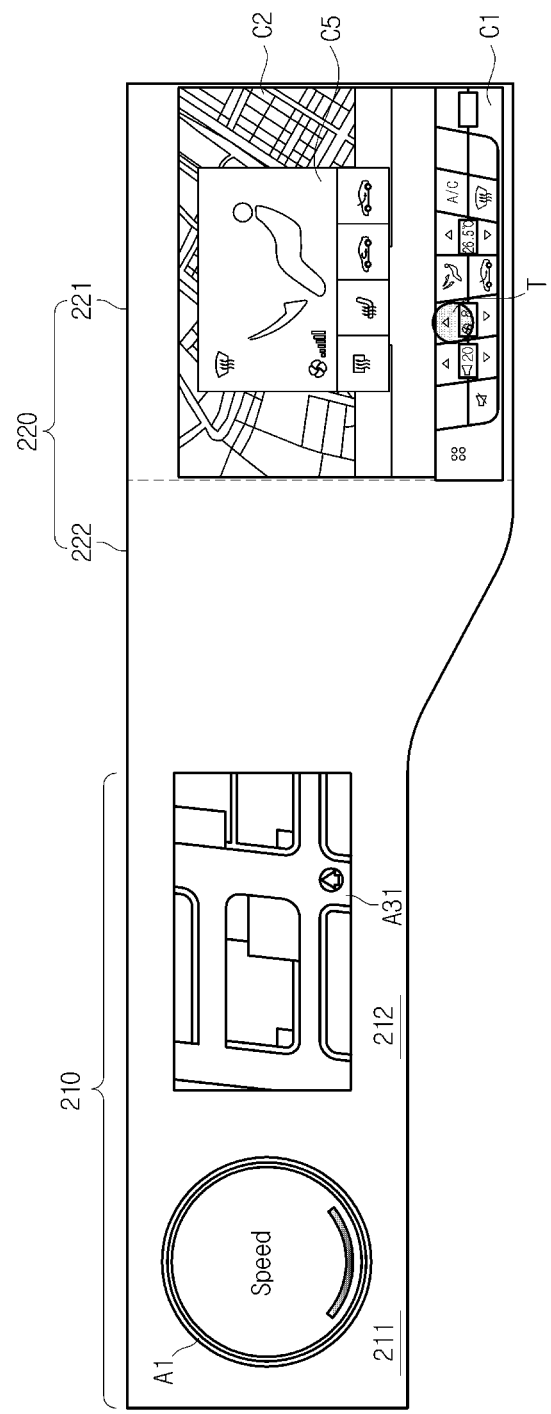
Figure 11D:
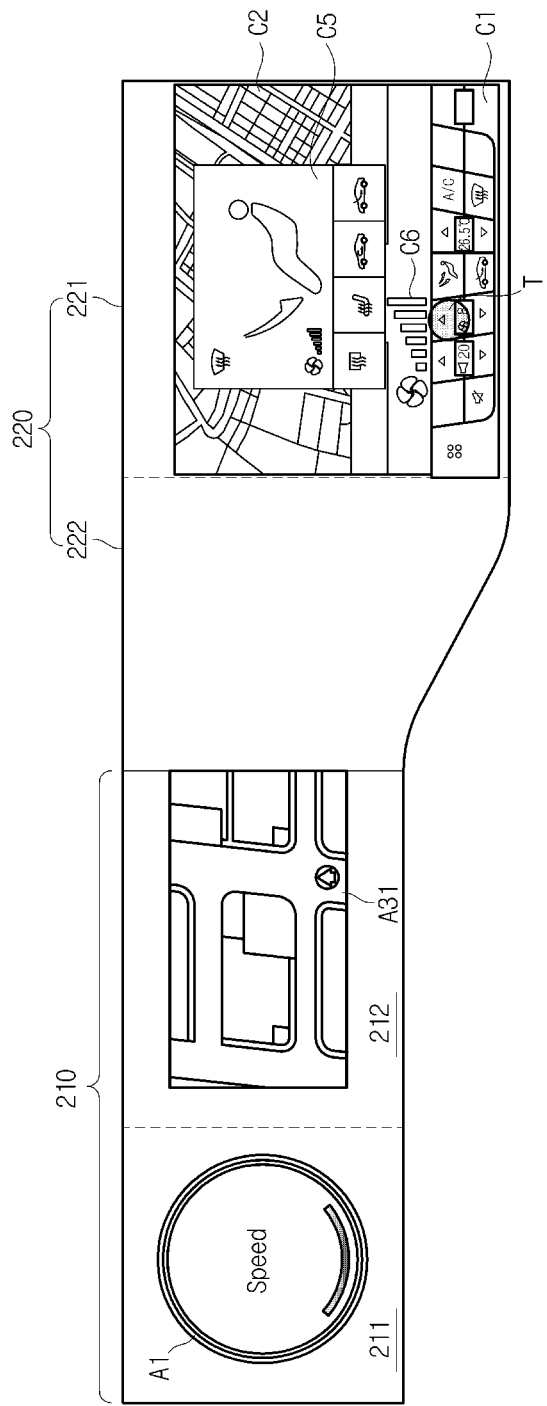

Thereafter, if a button for adjusting a wind strength in the button area 221a of the first area 221 is touched (input T), as shown in FIG. 11C, the second user interface 220 may overlap an image C6 for adjusting a wind strength with the image C2 of the navigation function displayed in the first area 221 such that the image C6 is displayed in an area which is different from an area in which the image C5 for controlling the air condition function is displayed, as shown in FIG. 11D.

Figure 12A:
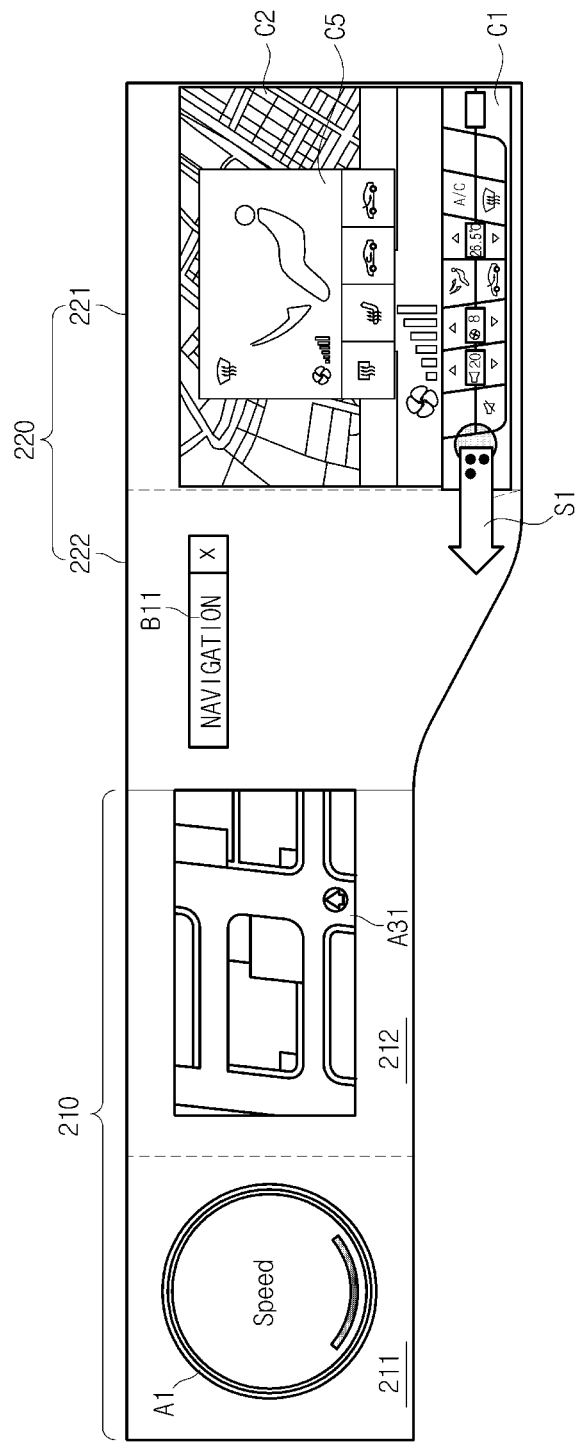
FIGS. 12A and 12B illustrate user interfaces for describing an example of a method of linking an air conditioning function using a user interface apparatus according to an embodiment of the present disclosure.
Figure 12B:
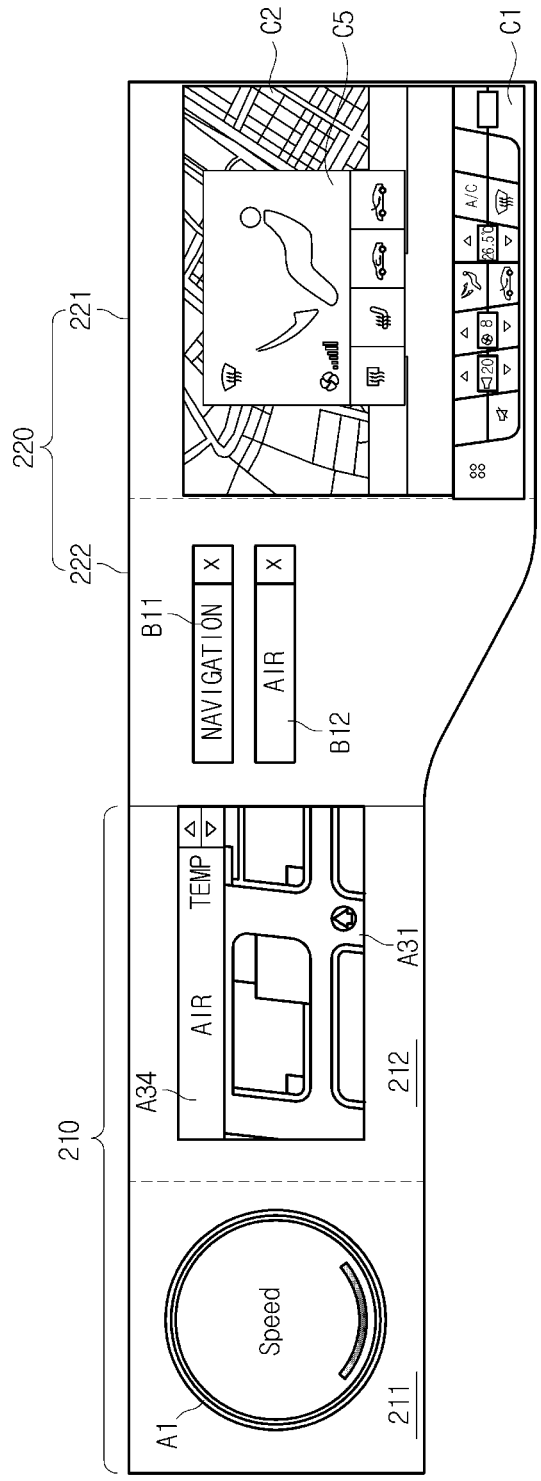

FIGS. 12A and 12B illustrate user interfaces for describing an exemplary embodiment of a method of linking an air conditioning function using the user interface apparatus 200 according to an embodiment of the present disclosure.

As shown in FIG. 12A, the first user interface 210 may display an image A1 of driving information in the static area 211, and display an image A31 of a navigation function in the variable area 212. Also, the second user interface 220 may display an image C2 of the navigation function and an image C1 of buttons for controlling an air conditioning function, in the first area 221, such that an image C5 of the air conditioning function overlaps with the image C2 of the navigation function, and display a list B11 of linking information in the second area 222.

If multiple touch inputs are applied on the button image C1 and slide in the first direction S1, the second user interface 220 may transmit information of the air conditioning function to the first user interface 210.

Then, the second user interface 220 may display a list of the air conditioning function in the second area 222, and the first user interface 210 may display an image A34 of the air conditioning function above the image A31 of the navigation function, together with buttons for controlling the air conditioning function, in order to enable a user to control the air conditioning function, as shown in FIG. 12B.

Herein, the buttons for controlling the air conditioning function may include temperature setting buttons, wind strength adjustment buttons, an auto air conditioning button, and an indoor air/outdoor air selection button.

If a radio function is selected, an FM/AM selection button and frequency selection buttons may be displayed, and a name of a broadcasting program, a channel logo image, etc. may be further displayed.

If a music play function is selected, an album image, a title of music, a singer's name, a playback time, etc. may be displayed.

A control configuration of the user interface apparatus 200 according to another embodiment will be described with reference to FIG. 4, below.

The first user interface 210 may include the first display panel 230 and the first driving module 240 to drive the first display panel 230, wherein the first display panel 230 may be a flat panel, such as a LCD, a PDP, and an OLED.

The second user interface 220 may include a second display panel 250*a* and a touch panel 250*b* to receive touch signals, and further include the second driving module 260 to drive the second display panel 250*a*, wherein the second display panel 250*a* may be a flat panel, such as a LCD, a PDP, and an OLED, and the second display panel 250*a* and the touch panel 250*b* may configure a touch screen 250.

As shown, the first driving module 240 includes the first communication unit 241, the first controller 242, the first storage unit 243, and the first driver 244, and the second driving module 260 may include the signal receiver 261, the second controller 262, the second communication unit 263, the second storage unit 264, and the second driver 265. Hereinafter, a newly added configuration except for configurations mentioned in the embodiment described above with reference to FIG. 4 will be described.

The first communication unit 241 may transmit host information being driving information that is displayed in a variable area of the first display panel 230, to the second driving module 260.

Herein, driving information that is displayed in the variable area of the first display panel 230 may be a tachometer (that is, a RPM meter).

If a signal representing sliding in the first direction and guest information are received, the first controller 242 may transmit host information to the second driving module 260.

The second controller 262 may control the second user interface 220 to scale down the host information received from the first driving module 240 and display the scaled-down host information in the second area.

The second communication unit 263 may receive the host information received from the first driving module 240.

An example of an operation of the user interface apparatus 200 according to another embodiment of the present disclosure will be described with reference to FIGS. 13A and 13B, below.

Figure 13A:
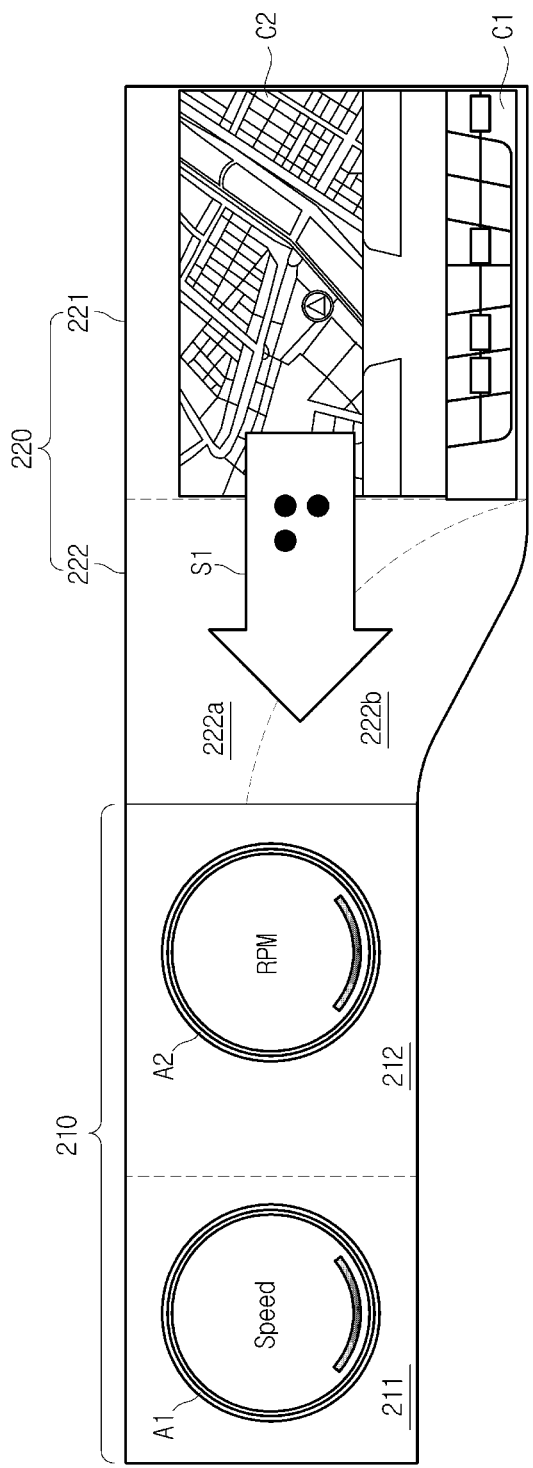

As shown in FIG. 13A, the second area 222 of the second user interface 220 may include a list area 222*a* to display lists of linking information, and a scale-down area 222*b* to scale down and display host information transmitted from the first user interface 210.

For example, the first user interface 210 may display an image A1 of speed information in the static area 211, and an image A2 of RPM information in the variable area 212.

Also, the second user interface 220 may display a plurality of buttons C1 to control an air conditioning function and additional functions in the button area 221*a* of the first area 221, and display information C2 of a function being currently executed in the function display area 221*b* of the first area 221.

For example, if a navigation function is being executed, the second user interface 220 may display an image C2 of the navigation function in the function display area 221*b* of the first area 221.

If multiple touch inputs are applied on the image C2 and slide in the first direction S2, the second user interface 220 may transmit a signal representing sliding in the first direction S1 and information of a function being currently executed, to the first user interface 210.

Then, the second user interface 220 may display an image B11 of a list of linking information in the list area 222*a* of the second area 222, and display an image B21 of the host information displayed on the first user interface 210 in the scale-down area 222*b*, as shown in FIG. 13B.

Also, the first user interface 210 may transmit the host information displayed in the variable area 212 to the second user interface 220, and display an image A31 of information of the function transmitted from the second user interface 220, in the variable area 212.

At this time, the image A31 of the navigation function that is displayed in the variable area 212 of the first user interface 210 may be more briefly represented than the image C2 of the navigation function displayed in the function display area 221*b* of the second user interface 220.

Also, when information of the navigation function is displayed in the variable area 212 of the first user interface 210, traffic enforcement information, estimated time of arrival, a destination, a remaining distance, and so on may be further displayed together with a map.

Also, the information of the navigation function that is displayed in the variable area 212 of the first user interface 210 may be a close-range map.

If a deletion button for deleting a list displayed in the list area 222*a* of the second area 222 is touched, the second user interface 220 may delete the list image B11 and the scale-down image B21 of the host information from the second area 222.

At this time, the first user interface 210 may delete the image A31 of the navigation function displayed in the variable area 212, and display driving information which is a host image.

A control configuration of the user interface apparatus 200 according to another embodiment of the present disclosure will be described with reference to FIG. 4, below.

The first user interface 210 may include the first display panel 230 and the first driving module 240 to drive the first display panel 230, wherein the first display panel 230 may be a flat panel, such as a LCD, a PDP, and an OLED.

The second user interface 220 may include the second display panel 250a and the touch panel 250b to receive touch signals, and further include the second driving module 260 to drive the second display panel 250a, wherein the second display panel 250a may be a flat panel, such as a LCD, a PDP, and an OLED, and the second display panel 250a and the touch panel 250b may configure the touch screen 250.

The first driving module 240 may include the first communication unit 241, the first controller 242, the first storage unit 243, and the first driver 244, and the second driving module 260 may include the signal receiver 261, the second controller 262, the second communication unit 263, the second storage unit 264, and the second driver 265. Hereinafter, a newly added configuration except for configurations mentioned in the embodiment described above with reference to FIG. 4 will be described.

The first communication unit 241 may transmit host information being driving information that is displayed in a variable area of the first display panel 230, to the second driving module 260.

Herein, vehicle information that is displayed in the variable area of the first display panel 230 may be a tachometer (that is, a RPM meter).

If a signal representing sliding in the first direction and guest information are received, the first controller 242 may transmit host information to the second driving module 260.

The first controller 242 may control the first user interface 210 to display vehicle information in the variable area.

If a signal representing sliding in the first direction is received from the second driving module 260, the first controller 242 may control the first user interface 210 to scale down vehicle information and display the scaled-down vehicle information below the guest information in the variable area, and if a signal representing sliding in the second direction is received from the second driving module 260, the first controller 242 may control the first user interface 210 to restore the vehicle information in the variable area.

Also, if an external button (not shown) is touched when the scaled-down vehicle information is displayed below the guest information in the variable area, the first controller 242 may control the first user interface 210 to scale up the vehicle information and to display the scaled-up vehicle information in one side of the guest information. Thereafter, if a predetermined time period elapses from when the vehicle information is scaled up, the first controller 242 may control the first user interface 210 to scale down and display the vehicle information below the guest information in the variable area.

Herein, the vehicle information may include gauge information, mileage information, cooling water temperature information, and wheel information. The external button, which is a button for checking vehicle information, may be a trip button or a wheel flex button.

Also, the first controller 242 may control the first user interface 210 to scale down, when controlling a display of vehicle information, an image of guest information by a predetermined size, and to display vehicle information with the predetermined size.

The second controller 262 may control the second user interface 220 to scale down host information received from the first driving module 240, and to display the scaled-down host information in the second area 212.

The second controller 262 may make sound when adding or deleting linking information, and show a linking process as a graphic image.

The second communication unit 263 may receive host information from the first driving module 240.

The second storage unit 264 may store commands for executing operations corresponding to sliding directions.

For example, a signal representing sliding in the first direction may be a command for transmitting information of a function to which a touch input is applied, and a signal representing sliding in the second direction may be a command for scaling down vehicle information displayed on the first display panel 230.

Hereinafter, an example of a display on the user interface apparatus 200 will be described with reference to FIG. 14, below.

Figure 14:
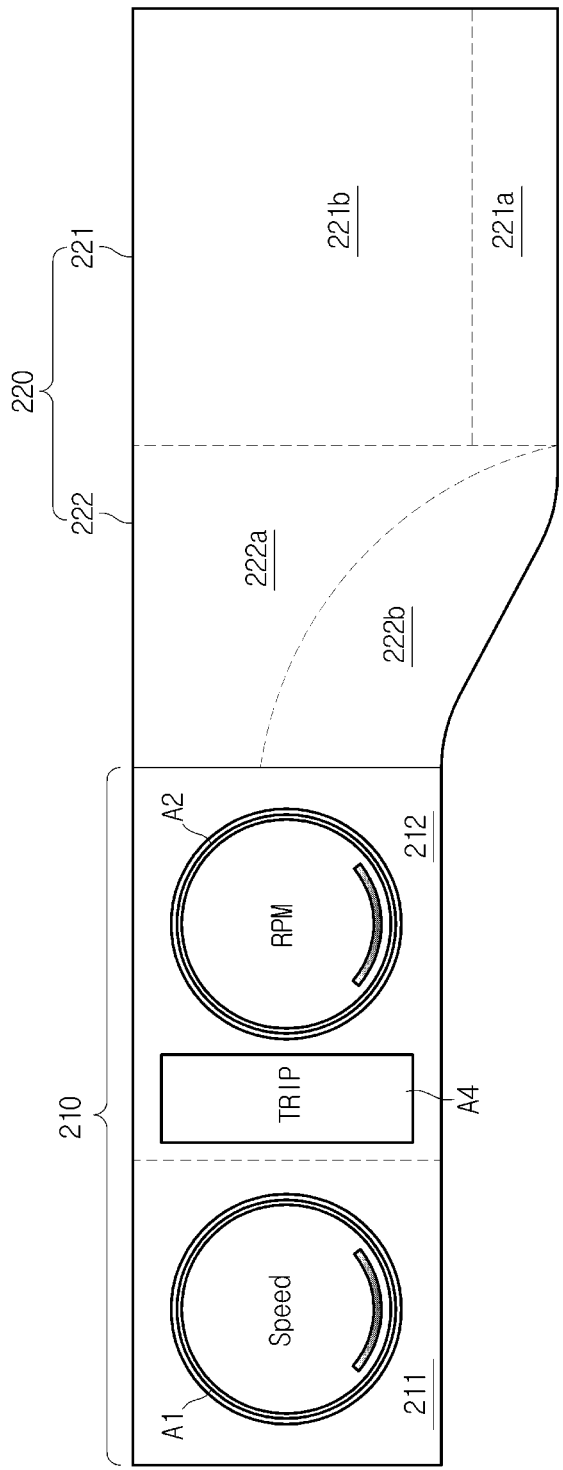
FIG. 14 illustrates an exemplary display on a user interface apparatus according to another embodiment of the present disclosure.

As shown in FIG. 14, the first user interface 210 may display an image A1 of speed information in the static area 211, and display an image A2 of RPM information and an image A4 of vehicle information in the variable area 212.

The second user interface 220 may include the first area 221 to display operation information of various functions, and the second area 222 to display linking information. In the first area 221, an image C2 of a navigation function and a button image C1 may be basically displayed.

Examples of operations of the user interface apparatus 200 according to another embodiment of the present disclosure will be described with reference to FIGS. 15A to 15F, 16A to 16D, and 17A and 17B, below.

Figure 15A:
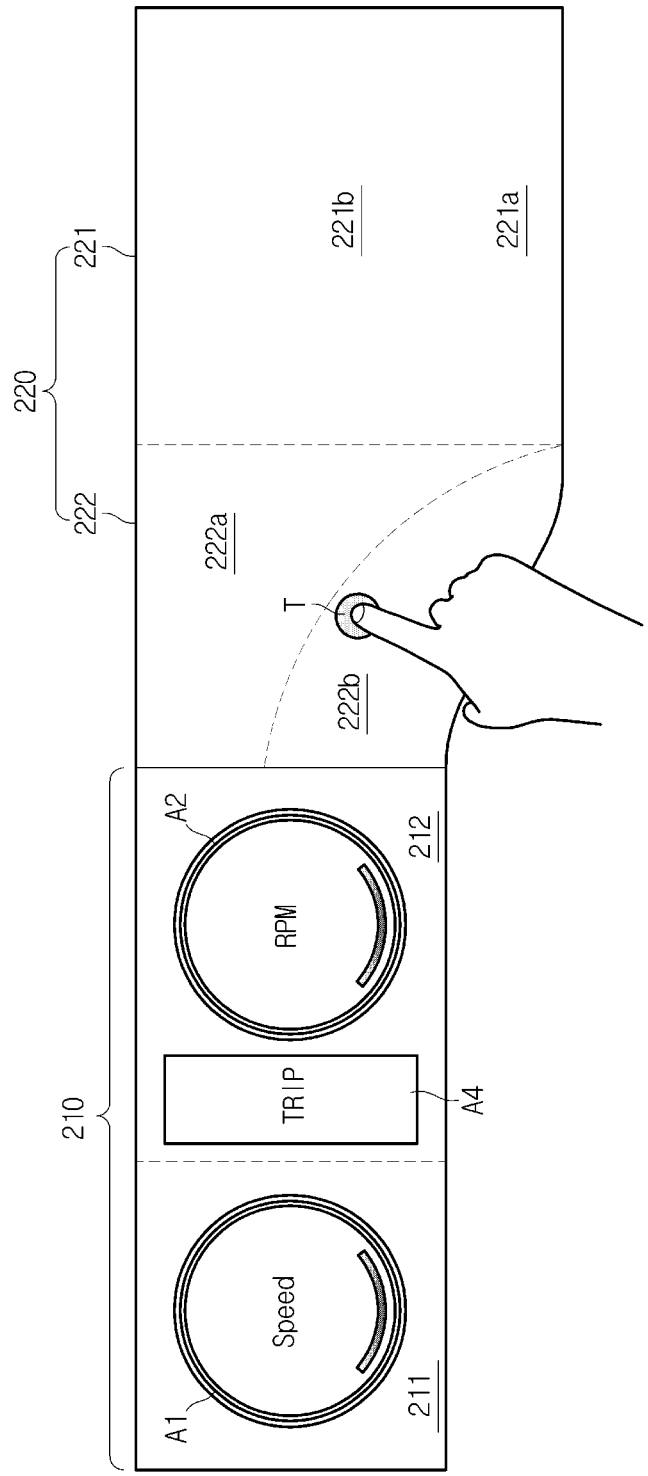

As shown in FIG. 15A, the first user interface 210 may display an image A1 of speed information in the static area 211, and display an image A2 of RPM information and an image A4 of vehicle information in the variable area 212.

Figure 15B:
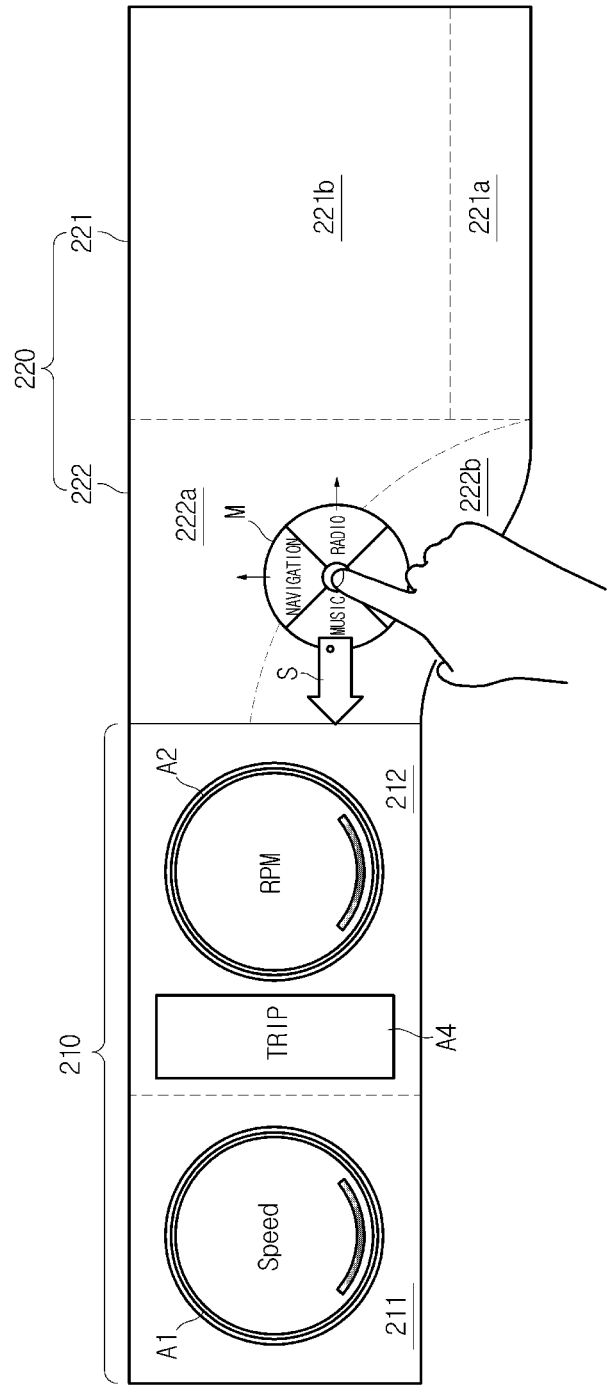

In this state, if a single touch input (T) is applied on the second area 222 for a predetermined time period or more, the second user interface 220 may display a menu M in the list area 222a of the second area 222, as shown in FIG. 15B.

Figure 15C:
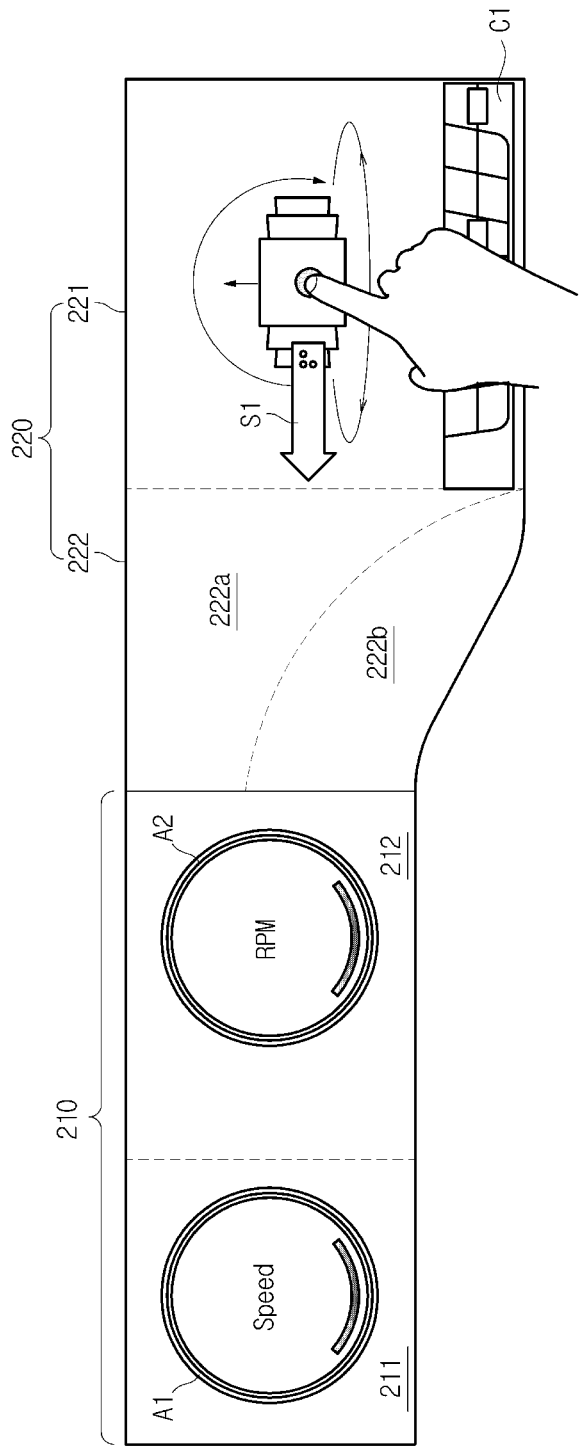

Then, if a single touch input is applied at a location corresponding to a music play function of the menu M, and slides in the first direction (S), the second user interface 220 may display an image of the music play function in the first area 221, as shown in FIG. 15C.

The second user interface 220 may change a music list based on a single touch input. If multiple touch inputs are applied on a music album and slide in the first direction S1, the second user interface 220 may transmit a signal representing sliding in the first direction and information of a function being currently executed, to the first user interface 210.

Figure 15D:
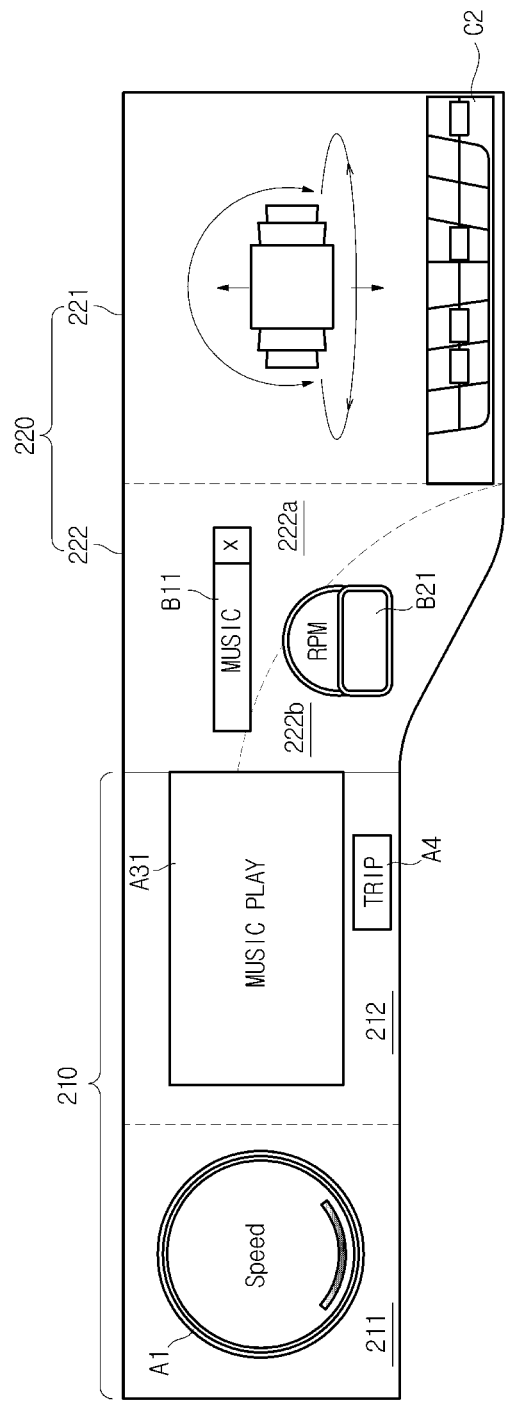
Figure 15F:
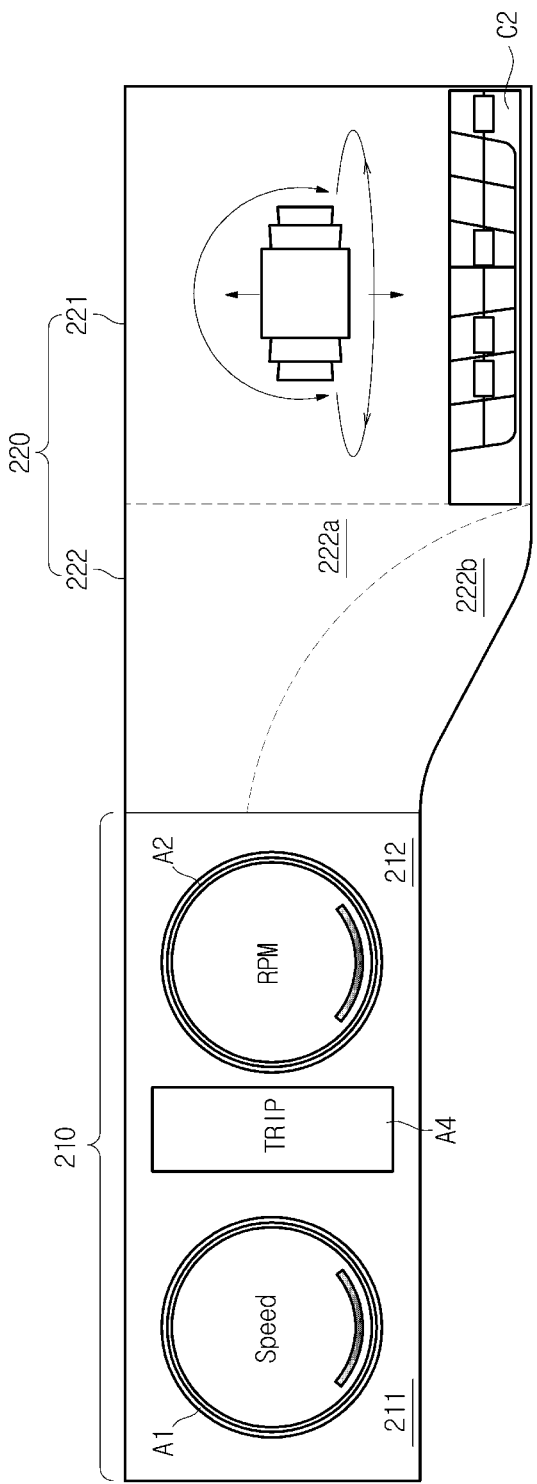

Then, as shown in FIG. 15D, the second user interface 220 may display an image B11 of the music list in the list area 222a of the second area 222, and display host information as a scaled-down image in the scale-down area 222b. Also, the first user interface 210 may display an image A31 of the music play function in the variable area 212, and scale down and display the image A4 of the vehicle information below the image A31 of the music play function.

Also, the information of the music play function that is displayed in the variable area 212 of the first user interface 210 may be more briefly represented than the information of the music play function displayed in the first area 221 of the second user interface 220.

As shown in FIG. 15E, if a single touch input is applied on the list B11 displayed in the list area 222a of the second area 222 and slides in the second direction S2, the second user interface 220 may delete the list B11 displayed in the list area 222a of the second area 222, and also delete the host information displayed in the scale-down area 222b of the second area 222, as shown in FIG. 15E.

Then, the first user interface 210 may display an image A2 of driving information, which is host information, in the variable area 212, and restore the image A4 of the vehicle information, in the variable area 212. In this way, vehicle information may be provided to a driver.

Figure 16A:
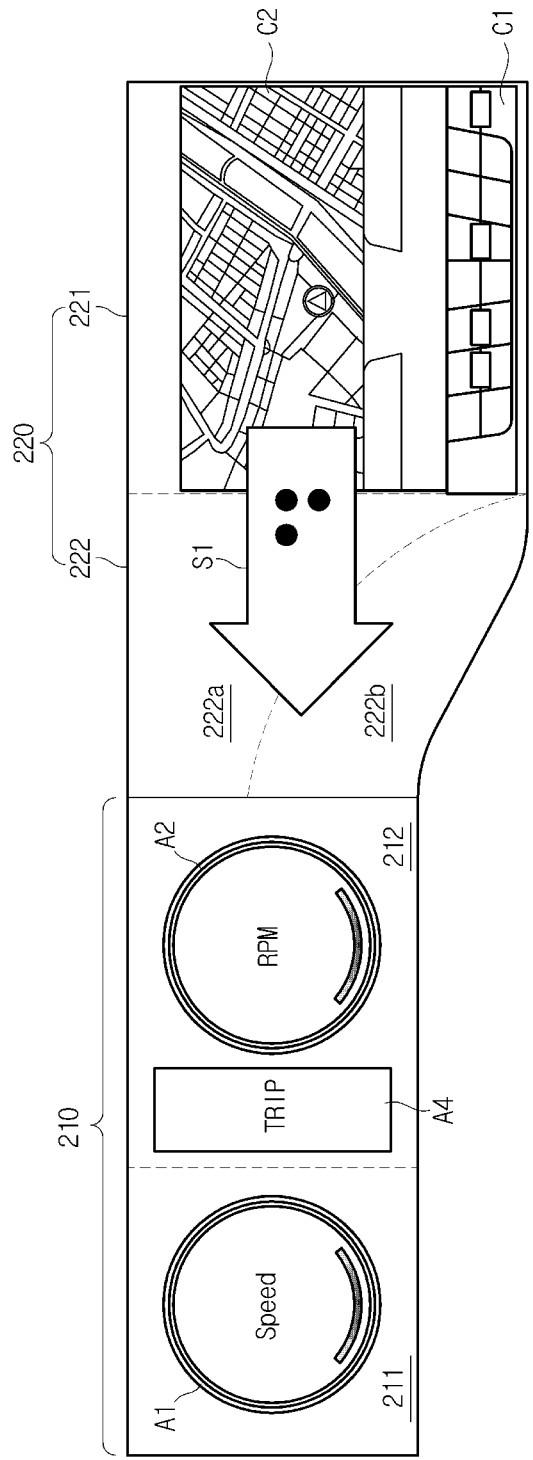

As shown in FIG. 16A, the first user interface 210 display an image A1 of speed information in the static area 211, and display an image A2 of RPM information and an image A4 of vehicle information in the variable area 212.

The second user interface 220 may display an image of a navigation function and a button image in the first area 221.

Figure 16B:
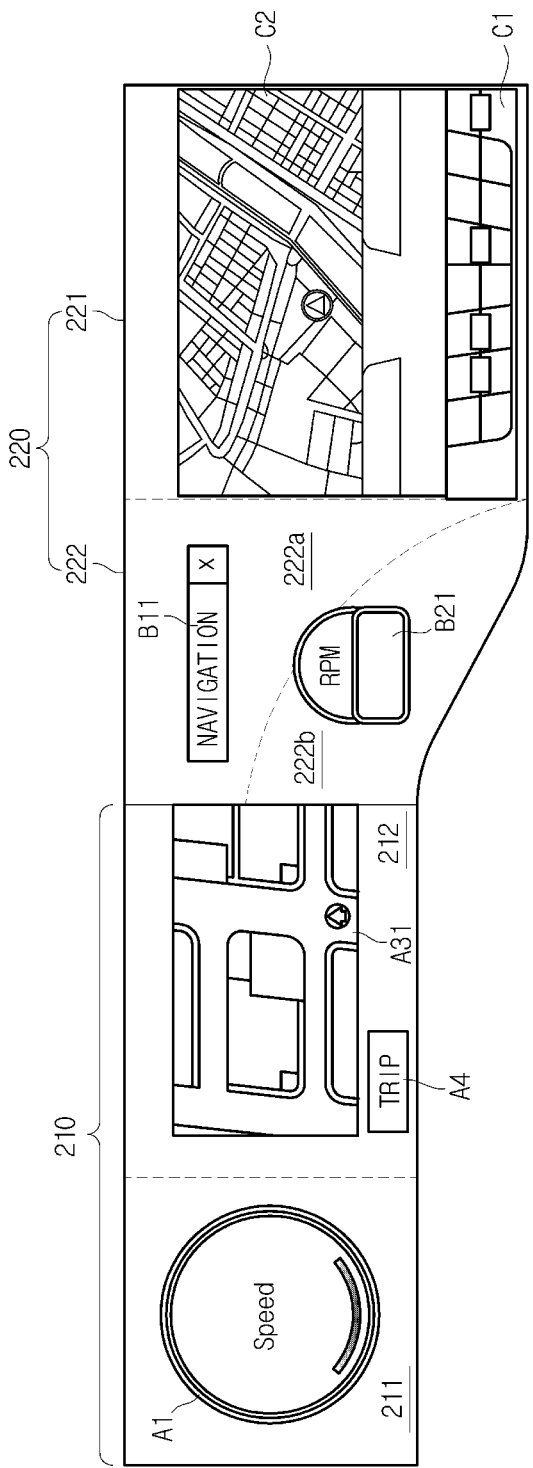

In this state, if multiple touch inputs are applied on the second area 222 and slide in the first direction S1, the second user interface 220 may display an image B11 of a navigation list in the list area 222a of the second area 222, and display host information as a scaled-down image in the scale-down area 222b, as shown in FIG. 16B.

Also, the first user interface 210 may display an image A31 of the navigation function in the variable area 212, and scale down and display an image A4 of vehicle information below the image A31 of the navigation function.

Figure 16C:
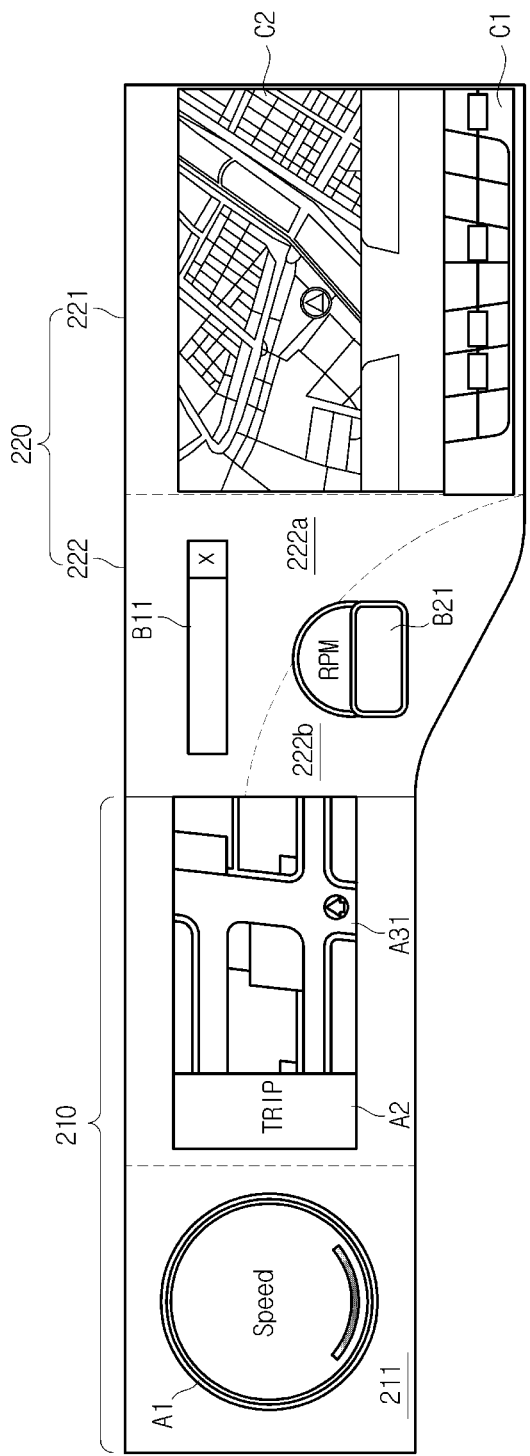

As shown in FIG. 16C, if a trip button (not shown) that is an external button is touched, the first user interface 210 may scale up and display the vehicle information in one side of the image A31 of the navigation function for a predetermined time period.

Figure 16D:
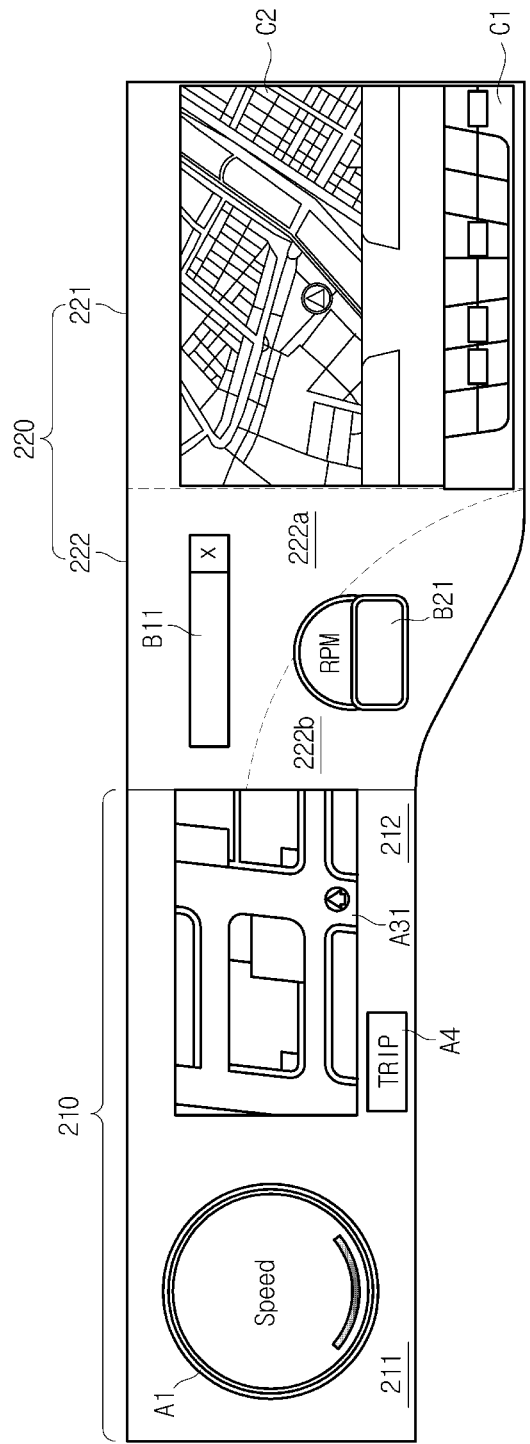

As shown in FIG. 16D, if a predetermined time period elapses after the vehicle information is scaled up and displayed, the first user interface 210 may again scale down and display the vehicle information below the image A31 of the navigation function. In this way, vehicle information may be selectively provided to a driver.

Figure 17A:
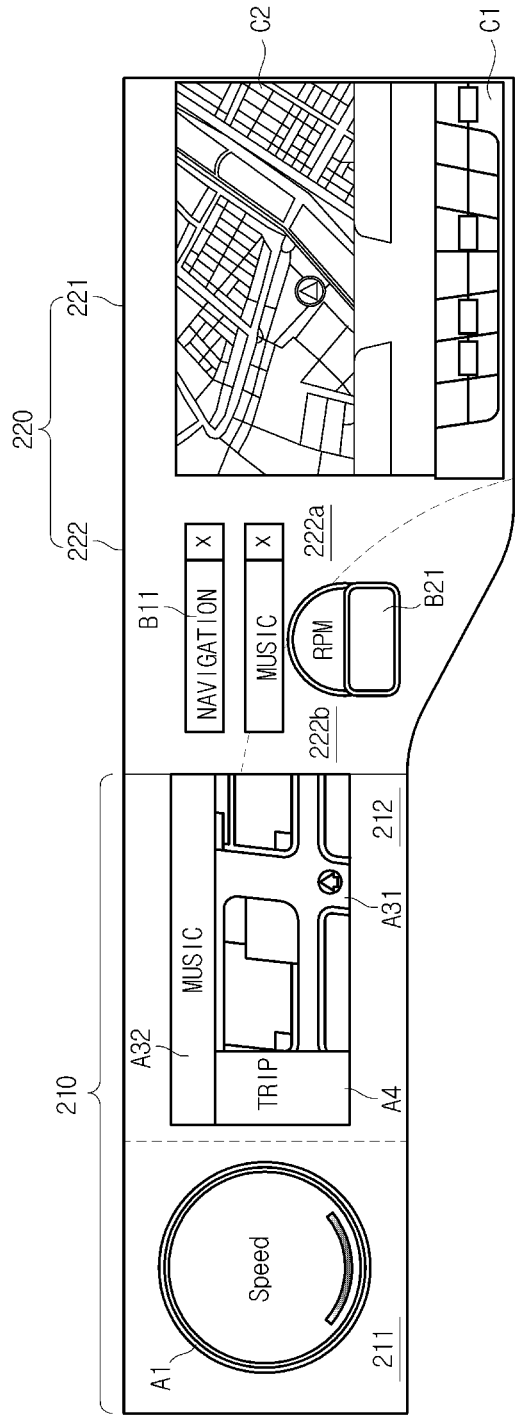

Also, as shown in FIG. 17A, if there are two linking information with respect to the second user interface 220, the first user interface 210 may display an image A31 of a navigation function in the variable area 212, display an image A32 of a music play function above the image A31 of the navigation function, and scale down and display an image A4 of vehicle information below the image A31 of the navigation function.

If an external button (not shown) is touched, the first user interface 210 may scale up and display the image A4 of the vehicle information in one side of the image A31 of the navigation function and below the image A32 of the music play function, for a predetermined time period.

Figure 17B:
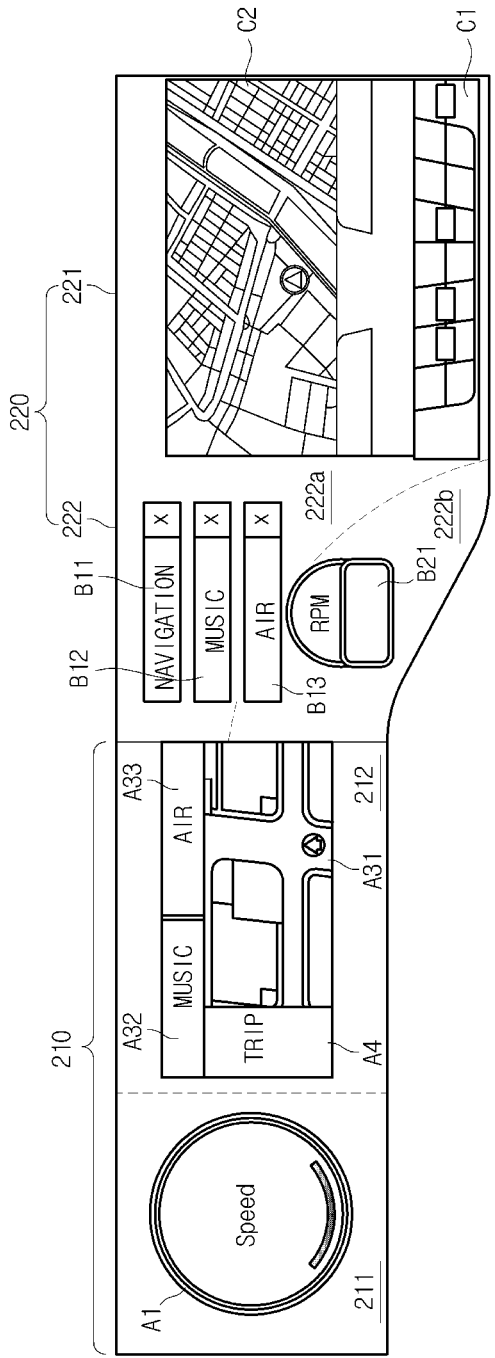

As shown in FIG. 17B, if there are three linking information with respect to the second user interface 220, the first user interface 210 may display the image A31 of the navigation function in the variable area 212, display the image A32 of the music play function and an image A33 of an air conditioning function above the image A31 of the navigation function, and scale down and display the image A4 of vehicle information below the image A31 of the navigation function.

If a trip button (not shown) that is an external button is touched, the first user interface 210 may scale down the image A31 of the navigation function by a predetermined size, and display the image A4 of the vehicle information with the predetermined size.

Also, as shown in FIG. 18, if a function is selected, the second user interface 220 may display a gesture guide C7 for controlling the selected function, for a predetermined time period.

As described above, by integrating a cluster which is a first user interface with a center fascia which is a second user interface to implement a large area screen, and linking information between the cluster and the center fascia, it is possible to reduce attention dispersion during driving, to improve a driver's recognition rate, and to improve a driver's convenience.

That is, by enabling a driver to move information of functions that are often used from the center fascia to the cluster using touch inputs of three fingers so that the driver can easily check important information during driving, it is possible to reduce attention dispersion during driving and to improve a driver's convenience and satisfaction.

Also, since information is linked and moved between the cluster and the center fascia, it is possible to highlight a graphic effect of a large area screen and to give a driver a new experience.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A user interface apparatus comprising:
   a first user interface including:
      a first display panel including:
         a first region to position- and size-changeably display at least one of host information and guest information, and
         a second region to position- and size-fixedly and permanently display entire static information that is different from the host information and is not removable, and the second region is precluded from adding other information, and
      a first controller configured to control an operation of the first display panel; and
   a second user interface including:
      a second display panel configured to display at least one of guest information and a list of information that is linked with the first user interface, and
      a second controller configured to control an operation of the second display panel,
   wherein when a first linking command of a linking signal for the guest information is received,
   the second controller of the second user interface is configured to:
      control a transmission of the guest information of the second display panel to the first user interface so that a display of the guest information is linked, and
      control an operation of the second display panel so that the list is displayed in the second display panel,
   the first controller of the first user interface is configured to
      change the host information displayed in the first display panel with the guest information of the second display panel, and
      control an operation of the first display panel so that the guest information is displayed in the first display panel, and when a second linking command of the linking signal is received, delete the guest information displayed in the first display panel, and control the operation of the first display panel so that the host information is displayed in the first display panel, wherein an image of a navigation function displayed in the first region of the first user interface is more brief in content than an image of the navigation function displayed in the second user interface, when controlling a display of a plurality of linked functions in addition to the navigation function in the first user interface, the image of a navigation function is enlarged while remaining linked functions other than the navigation function are sequentially displayed, and wherein, when controlling the sequential display of the remaining linked functions other than the navigation function, the first controller of the first user interface is configured to identify an order in which the remaining linked functions selected by a user through at least one of an input device or a touch panel provided in the second user interface are selected, and to control operation of the first display panel so that the remaining linked functions are sequentially displayed in a horizontal direction or a vertical direction in the identified order.

2. The user interface apparatus according to claim 1, wherein the first command includes a signal representing a first sliding in a first direction, and the second linking command includes a signal representing a second sliding in a second direction.

3. The user interface apparatus according to claim 1, wherein the second user interface comprises:

a first area to display the guest information, and a second area to display the list of information that is linked with the first user interface.

4. The user interface apparatus according to claim 1, wherein the guest information that is displayed in the first user interface and the guest information that is displayed in the second user interface are different images.

5. The user interface apparatus according to claim 1, wherein the first user interface is further configured to transmit the host information to the second user interface based on a control command of the first controller if the linking signal for the host information is received, and the second display panel of the second user interface scales down the host information and displays the scaled-down host information.

6. The user interface apparatus according to claim 1, wherein the first display panel of the first user interface further displays additional information, and scales down and displays the additional information based on a control command of the first controller if the linking signal for the additional information is received.

7. The user interface apparatus according to claim 6, wherein if an external button is selected, the first display panel of the first user interface scales up the scaled-down additional information and displays the scaled-up additional information for a predetermined time period based on a control command of the first controller.

8. A vehicle comprising:

a first user interface provided in a cluster, including:

a first display panel including:

a first region to position- and size-changeably display at least one of host information and guest information, and a second region to position- and size-fixedly and permanently display entire static information that is different from the host information and is not removable, and the second region is precluded from adding other information, and a first controller configured to control an operation of the first display panel; and a second user interface provided in a center fascia, including:

a second display panel configured to display at least one of guest information, and a list of information that is linked with the first user interface, and a second controller configured to control an operation of the second display panel, wherein when a first linking command of a linking signal for the guest information is received, the second controller of the second user interface is configured to:

control a transmission of the guest information of the second display panel to the first user interface so that a display of the guest information is linked, and control an operation of the second display panel so that the list is displayed in the second display panel, the first controller of the first user interface is configured to:

change the host information displayed in the first display panel with the guest information of the second display panel, and control an operation of the first display panel so that the guest information is displayed in the first display panel, and when a second linking command of the linking signal is received, delete the guest information displayed in the first display panel, and control the operation of the first display panel so that the host information is displayed in the first display panel, wherein an image of a navigation function displayed in the first region of the first user interface is more brief in content than an image of the navigation function displayed in the second user interface, when controlling a display of a plurality of linked functions in addition to the navigation function in the first user interface, the image of a navigation function is enlarged while remaining linked functions other than the navigation function are sequentially displayed, and wherein, when controlling the sequential display of the remaining linked functions other than the navigation function, the first controller of the first user interface is configured to identify an order in which the remaining linked functions selected by a user through at least one of an input device or a touch panel provided in the second user interface are selected, and to control operation of the first display panel so that the remaining linked functions are sequentially displayed in a horizontal direction or a vertical direction in the identified order.

9. The vehicle according to claim 8, wherein the first display panel of the first user interface and the second display panel of the second user interface are arranged adjacent to each other.

10. The vehicle according to claim 8, wherein the first linking command includes a signal representing a first sliding in a first direction, and the second linking command includes a signal representing a second sliding in a second direction.

11. The vehicle according to claim 10, wherein each of the signal representing the first sliding input in the first direction and the signal representing the second sliding input in the second direction is generated when a plurality of touch inputs slide.

12. The vehicle according to claim 8, wherein if information of a navigation function is included in a plurality of guest information, the first controller of the first user interface gives the navigation function high priority.

13. The vehicle according to claim 8, wherein the second user interface comprises:
a first area to display the guest information, and
a second area to display a list of information that is linked with the first user interface.

14. The vehicle according to claim 8, wherein the list that is displayed in the second area comprises a deletion button.

15. The vehicle according to claim 14, wherein if the deletion button is touched in the list displayed in the second area, the second controller of the second user interface deletes the list, and controls a transmission of a command for stopping displaying information of a function corresponding to the list, to the first user interface.

16. The vehicle according to claim 8, wherein if the second area displays a plurality of lists, the second controller of the second user interface controls an operation of the first display panel so that the plurality of lists is sequentially displayed in an order in which linking commands are received.

17. The vehicle according to claim 8, wherein if the list displayed in the second area is touched and slides to the first area, the second controller of the second user interface deletes the list, and controls a transmission of a command for stopping displaying information of a function corresponding to the list, to the first user interface.

18. The vehicle according to claim 8, wherein the second display panel of the second user interface displays a menu if the second area is touched for a predetermined time period or more.

19. The vehicle according to claim 8, wherein if the first area is touched by a single touch input, the second controller of the second user interface executes a function corresponding to information displayed at the touched location of the first area.

20. The vehicle according to claim 8, wherein if second guest information is selected when first guest information is displayed in the first area, the second controller of the second user interface overlaps the second guest information with an image of the first guest information.

21. The vehicle according to claim 8, wherein if second guest information is selected when first guest information is displayed in the first area, the second controller of the second user interface deletes an image of the first guest information, and controls an operation of the second display panel so that the second guest information is displayed.

22. The vehicle according to claim 8, wherein the guest information that is displayed in the first display panel of the first user interface and the guest information that is displayed in the second display panel of the second user interface are different images.

23. The vehicle according to claim 8, wherein if the linking signal for the host information is received, the first controller of the first user interface controls so that the host information is transmitted to the second user interface, and
the second controller of the second user interface scales down the host information and displays the scaled-down host information.

24. The vehicle according to claim 8, wherein the first display panel of the first user interface further displays additional information, and
the first controller of the first user interface scales down and displays the additional information if the linking signal for the additional information is received.

25. The vehicle according to claim 24, wherein the additional information comprises gauge information, mileage information, cooling water temperature information, and outside temperature information.

26. The vehicle according to claim 24, wherein if an external button is selected, the first controller of the first user interface scales up the scaled-down additional information and the first display panel of the first user interface displays the scaled-up additional information for a predetermined time period.

27. The vehicle according to claim 25, wherein the first controller of the first user interface scales down the guest information by a predetermined size, and the first display panel of the first user interface displays the additional information with the predetermined size for a predetermined time period.

28. The vehicle according to claim 8, wherein the guest information comprises navigation function information, audio function information, video function information, radio function information, air conditioning function information, and music play function information.

29. A control method of a vehicle, comprising:
displaying host information on a first display panel of a first user interface during driving, the first display panel including:
a first area to position- and size-changeably display at least one of host information and guest information, and
a static area to position- and size-fixedly and permanently display entire static information;
displaying the static information that is different from the host information and is not removable on the static area precluded from adding other information of the first display panel of the first user interface;
displaying guest information on a first area of a second display panel of a second user interface;
transmitting the guest information to the first user interface if a first linking command is input to an input of the second user interface;
changing the host information displayed in a variable area of the first display panel of the first user interface to the guest information in the first area of the second display panel, and displaying the guest information in the variable area of the first display panel; and
displaying a list of the guest information on a second area of the second display panel of the second user interface,
wherein an image of a navigation function displayed in the first area of the first user interface is more brief in content than an image of the navigation function displayed in the second user interface,
when controlling a display of a plurality of linked functions in addition to the navigation function in the first user interface, the image of a navigation function is enlarged while remaining linked functions other than the navigation function are sequentially displayed, and
wherein the controlling the sequential display of the remaining linked functions other than the navigation function, comprises:
identifying an order in which the remaining linked functions selected by a user through at least one of an input device or a touch panel provided in the second user interface are selected, and controlling operation of the first display panel so that the remaining linked functions are sequentially displayed in a horizontal direction or a vertical direction in the identified order.

30. The control method according to claim 29, further comprising, if a second linking command is input to the input of the second user interface, displaying the host information in the variable area of the first display panel by deleting the guest information.

* * * * *